US012560448B2

(12) United States Patent
Kato

(10) Patent No.: US 12,560,448 B2
(45) Date of Patent: Feb. 24, 2026

(54) NAVIGATION DEVICE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 122 days.

(21) Appl. No.: 18/388,933

(22) Filed: Nov. 13, 2023

(65) Prior Publication Data

US 2024/0175700 A1 May 30, 2024

(30) Foreign Application Priority Data

Nov. 30, 2022 (JP) ................................. 2022-191113

(51) Int. Cl.
*G01C 21/36* (2006.01)
(52) U.S. Cl.
CPC ................................. *G01C 21/3679* (2013.01)
(58) Field of Classification Search
CPC .............. G01C 21/3679; G01C 21/362; G01C 21/3694; G08G 1/096827; G06Q 50/30; G06Q 10/08355; G06Q 10/06312; G06Q 10/063118; G06Q 10/063116; G06Q 10/063114
See application file for complete search history.

(56) References Cited

U.S. PATENT DOCUMENTS

2006/0235967 A1* 10/2006 Fritz ............... H04M 1/724098
709/224
2016/0076905 A1* 3/2016 Broadbent ......... G01C 21/3697
701/414
2022/0204011 A1 6/2022 Sugimoto et al.

FOREIGN PATENT DOCUMENTS

JP 2022-101105 A 7/2022

* cited by examiner

*Primary Examiner* — Andrew J Cromer

(74) *Attorney, Agent, or Firm* — TROUTMAN PEPPER LOCKE LLP

(57) ABSTRACT

A navigation device includes: one or more processors; and a storage medium containing a program to be executed by the one or more processors. The program includes one or more commands. The one or more commands cause the one or more processors to carry out a process of receiving trip data held in a random navigation device, in which the trip data includes positional data and vehicle data regarding a random vehicle on which the random navigation device is mounted, and a process of displaying the received trip data on a display unit.

6 Claims, 25 Drawing Sheets

USER ID; PARENT USER

USER ID; CHILD USER

NAVIGATION DEVICE

CROSS-REFERENCE TO RELATED APPLICATION

The present application claims priority from Japanese Patent Application No. 2022-191113 filed on Nov. 30, 2022, the entire contents of which are hereby incorporated by reference.

BACKGROUND

The disclosure relates to a navigation device that presents an occupant of a vehicle with information.

There have been techniques of transferring data acquired by an old vehicle to a new vehicle on the occasion of, for example, replacement of the old vehicle with the new vehicle.

For example, Japanese Unexamined Patent Application Publication (JP-A) No. 2022-101105 describes a technique of reproducing setting of an in-vehicle device regardless of vehicle models when the setting of the in-vehicle device is transferred between different vehicles.

SUMMARY

An aspect of the disclosure provides a navigation device including: one or more processors; and a storage medium containing a program to be executed by the one or more processors. The program includes one or more commands. The one or more commands cause the one or more processors to carry out a process of receiving trip data held in a random navigation device, in which the trip data includes positional data and vehicle data regarding a random vehicle on which the random navigation device is mounted, and a process of displaying the received trip data on a display unit.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
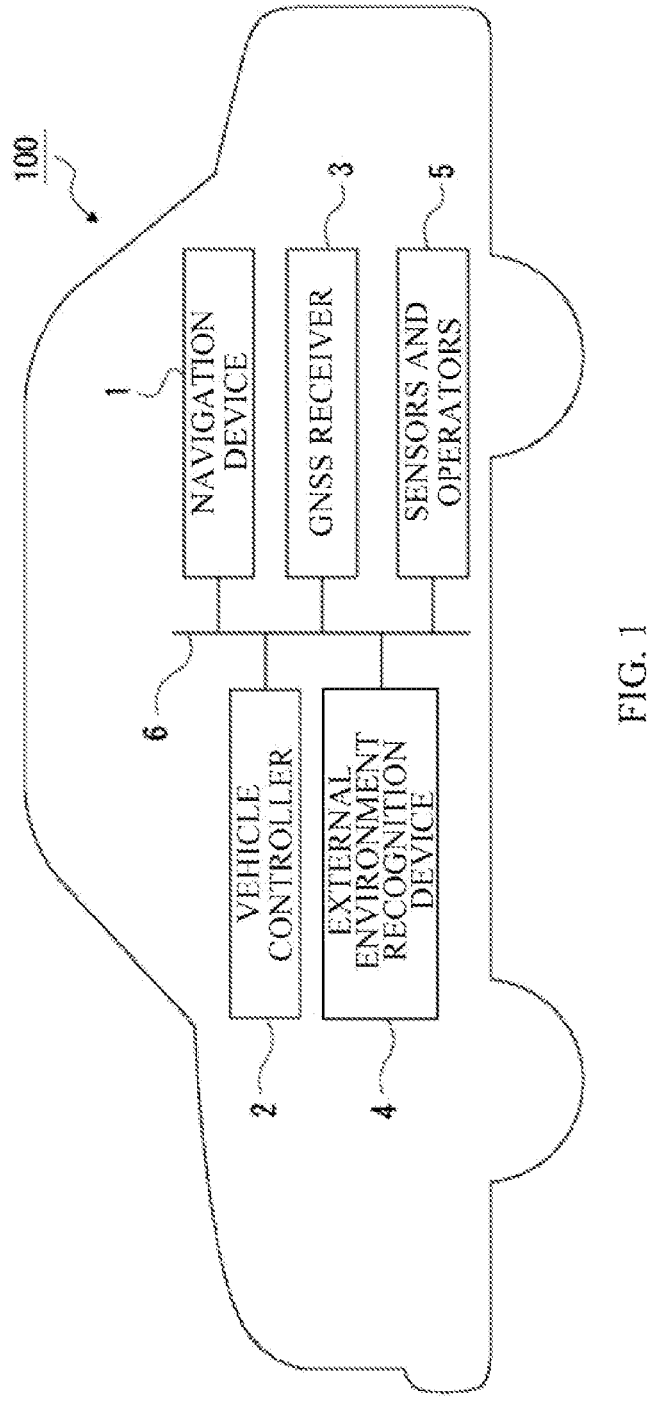
FIG. 1 is a schematic block diagram of a configuration example of a vehicle in an embodiment of the disclosure.

Data to be transferred between vehicles include data in a navigation device mounted on the vehicle.

A possible method of transferring data between vehicles may be to transfer setting values in the navigation device. However, this method involves difficulties in appropriately transferring trip data regarding, for example, resorts and restaurants visited. Thus, it is difficult to effectively present information to an occupant of the vehicle.

It is desirable to provide a travel history management system and a navigation device that make it possible to present an occupant of a vehicle with useful information.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a configuration example of a vehicle 100 including a navigation device 1 according to a first embodiment of the disclosure.

The vehicle 100 may include, for example, the navigation device 1, a vehicle controller 2, a global navigation satellite system (GNSS) receiver 3, an external environment recognition device 4, and sensors and operators 5.

The navigation device 1, the vehicle controller 2, the GNSS receiver 3, the external environment recognition device 4, and the sensors and operators 5 may be communicatably coupled to one another by, for example, a bus 6.

The navigation device 1 may perform, for example, processing of recommending and presenting a travel route from a current vehicle position to a destination in accordance with a search operation by a user.

The navigation device 1 may perform, for example, processing of accepting an operation of selecting a recommended and presented travel route, to set the route as a travel route, and various kinds of navigation processing in accordance with travel route.

The navigation device 1 may include, for example, a display unit and various operators.

In the following description, a vehicle position as a position of the vehicle 100 is simply referred to as a "current position".

The navigation device 1 in this embodiment may perform processing of presenting information regarding previously visited places near the current position or the travel route to the destination. Details are described later.

The vehicle controller 2 may include one or more microcomputers including, for example, a central processing unit (CPU), a read only memory (ROM), a random access memory (RAM). The vehicle controller 2 comprehensively represents controllers configured to control various units of the vehicle to cause the vehicle 100 to travel.

In one example, when the vehicle 100 includes an engine, the vehicle controller 2 may serve as an engine controller. For example, the vehicle controller 2 is configured to control various actuators provided as engine-related actuators, based on, for example, detection signals from predetermined sensors in the sensors and operators 5, and operation input data by operators in the sensors and operators 5.

As the engine controller, for example, the vehicle controller 2 is configured to perform a start control and a stop control of the engine in response to an operation of an ignition switch. Moreover, as the engine controller, the vehicle controller 2 is configured to control, for example, fuel injection timing, a fuel injection pulse width, and a throttle plate position based on detection signals from predetermined sensors such as an engine speed sensor and an accelerator opening sensor.

Furthermore, the vehicle controller 2 may serve as a transmission controller. For example, the vehicle controller 2 is configured to control various actuators provided as transmission-related actuators based on, for example, detection signals from predetermined sensors in the sensors and operators 5, and operation input data by the operators in the sensors and operators 5.

As the transmission controller, for example, when an automatic shifting mode is selected by a select lever, the vehicle controller 2 is configured to output a shifting signal to the actuator in accordance with a predetermined shifting pattern to make a shifting control. Moreover, as the transmission controller, when a manual shifting mode is set, the vehicle controller 2 is configured to output, to the actuator, a shifting signal in accordance with a shift-up and shift-down command by the select lever, to make the shifting control.

Furthermore, the vehicle controller 2 may serve as a brake controller. For example, the vehicle controller 2 is configured to control various actuators provided as brake-related actuators based on, for example, detection signals from predetermined sensors in the sensors and operators 5, and operation input data by the operators in the sensors and operators 5.

As the brake controller, for example, the vehicle controller 2 is configured to control a hydraulic pressure control actuator to brake the vehicle based on command data regarding hydraulic pressure. Moreover, as the brake controller, vehicle controller 2 is configured to realize a so-called antilock brake system (ABS) control by calculating a slip rate of a wheel from detection data by a predetermined sensor, and raising and lowering the hydraulic pressure by the hydraulic pressure control actuator in accordance with the slip rate.

Furthermore, the vehicle controller 2 is configured to make, for example, an automatic lane keeping control for driver assistance, an autonomous emergency braking (AEB) control for collision damage reduction, an adaptive cruise control (ACC) with an inter-vehicle distance control, and an automatic lane change control.

The vehicle controller 2 may obtain necessary steering torque in accordance with a target steering angle given by, for example, a driver assistance control, and control a steering-related actuator to realize necessary automatic steering.

The forgoing controls to be carried out by the vehicle controller 2 are merely examples. The vehicle controller 2 may be configured to make other controls.

The GNSS receiver 3 may be, for example, a global positioning system (GPS) receiver. The GNSS receiver 3 may receive radio waves from multiple navigation satellites to measure the current position of the vehicle 100.

Data regarding the measured current position may be presented to the navigation device 1.

The external environment recognition device 4 may be a device configured to recognize external environment of the vehicle 100 and acquire external environment data. The external environment recognition device 4 may include a microcomputer including, for example, a CPU, a ROM, and a RAM.

The external environment recognition device 4 may include, for example, a stereo camera, an image processing unit, a radar device, and other sensing devices. The stereo camera is configured to capture a forward view of the vehicle 100. The image processing unit may perform various kinds of processing on images acquired from the stereo camera. Non-limiting examples of the radar device may include millimeter wave radar and laser radar.

The stereo camera included in the external environment recognition device 4 may include multiple imaging units.

Each of the imaging units may include a camera optical system and an imaging element such as a charge coupled device (CCD) or complementary metal oxide semiconductor (CMOS). The camera optical system forms an object image on an imaging plane of the imaging element, to obtain, on a pixel-by-pixel basis, electric signals corresponding to an amount of received light.

Each of the imaging units may be installed to allow for a distance measurement by a so-called stereo imaging method. The electric signals obtained by the respective imaging units may be subjected to analog-to-digital (A-D) conversion and predetermined correction processing. The resultant signals may be supplied to the image processing unit as digital image signals, i.e., captured image data. The digital image signals represent luminance values by predetermined gradation on the pixel-by-pixel basis.

It is to be noted that the external environment recognition device 4 may include a camera device including one imaging unit, instead of the stereo camera. The one imaging unit includes an imaging element configured to make a distance measurement. It is to be noted that the external environment recognition device 4 may include, for example, an imaging unit configured to capture a rearward view of the vehicle 100, and an imaging unit configured to capture a sideward view of the vehicle 100, in addition to the stereo camera configured to capture the forward view of the vehicle 100.

The image processing unit included in the external environment recognition device 4 may include, for example, a microcomputer including a CPU, a ROM, and a RAM. The image processing unit included in the external environment recognition device 4 may carry out predetermined image processing related to recognition of the external environment based on the captured image data obtained by the imaging units of, for example, the stereo camera. The image processing by the image processing unit may be performed by using a storage such as a nonvolatile memory included in the external environment recognition device 4.

By this image processing, the external environment recognition device 4 may recognize, for example, three-dimensional object data ahead of the vehicle, and data regarding, for example, lane lines. The lane lines may include, for example, a center line and borderlines of a lane. Based on the data recognized, the external environment recognition device 4 may estimate a road or a lane on which the vehicle is traveling, i.e., a vehicle traveling lane. Moreover, the external environment recognition device 4 may detect, for example, a preceding vehicle on the vehicle traveling lane based on the three-dimensional object data recognized by the image processing.

The sensors and operators 5 collectively represent various sensors and operators provided in the vehicle 100. Sensors and operators to be included in the sensors and operators 5 may include a vehicle speed sensor, an engine speed sensor, an accelerator opening sensor, a steering angle sensor, a yaw rate sensor, a G sensor, a water temperature and oil temperature sensor, a fuel sensor, and a brake switch. The vehicle speed sensor may detect a speed of the vehicle. The engine speed sensor may detect a rotational speed of the engine. The accelerator opening sensor may detect an accelerator opening from an amount of stepping down of an accelerator pedal. The steering angle sensor may detect a steering angle. The yaw rate sensor may detect a yaw rate. The G sensor may detect an acceleration rate. The water temperature and oil temperature sensor may measure a temperature of cooling water and a temperature of oil as an index in estimating an engine temperature. The fuel sensor may detect an amount of remaining fuel by measuring a vertical position of a float provided in a fuel tank. The brake switch may be turned on or off in accordance with presence or absence of an operation of a brake pedal.

The sensors and operators 5 may further include, for example, an intake air flow sensor, a throttle opening sensor, an outside air temperature sensor, various temperature sensors, and a gradient sensor. The intake air flow sensor may detect an intake air flow to the engine. The throttle opening sensor may detect a throttle plate position of a throttle valve. The throttle valve is interposed in an intake passage and configured to adjust an intake air flow to be supplied to each cylinder of the engine. The outside air temperature sensor may detect an outside air temperature outside the vehicle. The various temperature sensors may detect a temperature of a wheel and a brake temperature. The gradient sensor may detect a gradient of a travel path of the vehicle.

Operators to be included in the sensors and operators 5 may include, for example, the ignition switch, an operator provided for a switchover of driving modes as an operation related to the driver assistance control mentioned above, the selection lever, and a display changeover switch. The ignition switch is provided for giving a command to start or stop the engine. The selection lever is provided for selection of an automatic transmission mode and a manual transmission mode in an automatic transmission and for giving a command for upshifting and downshifting in the manual transmission mode. The display changeover switch is provided for switching display information in a multi-function display (MFD) provided as the display unit.

It is to be noted that, in one embodiment of the disclosure, the MFD may serve as a "display unit" in the navigation device 1.

Figure 2:
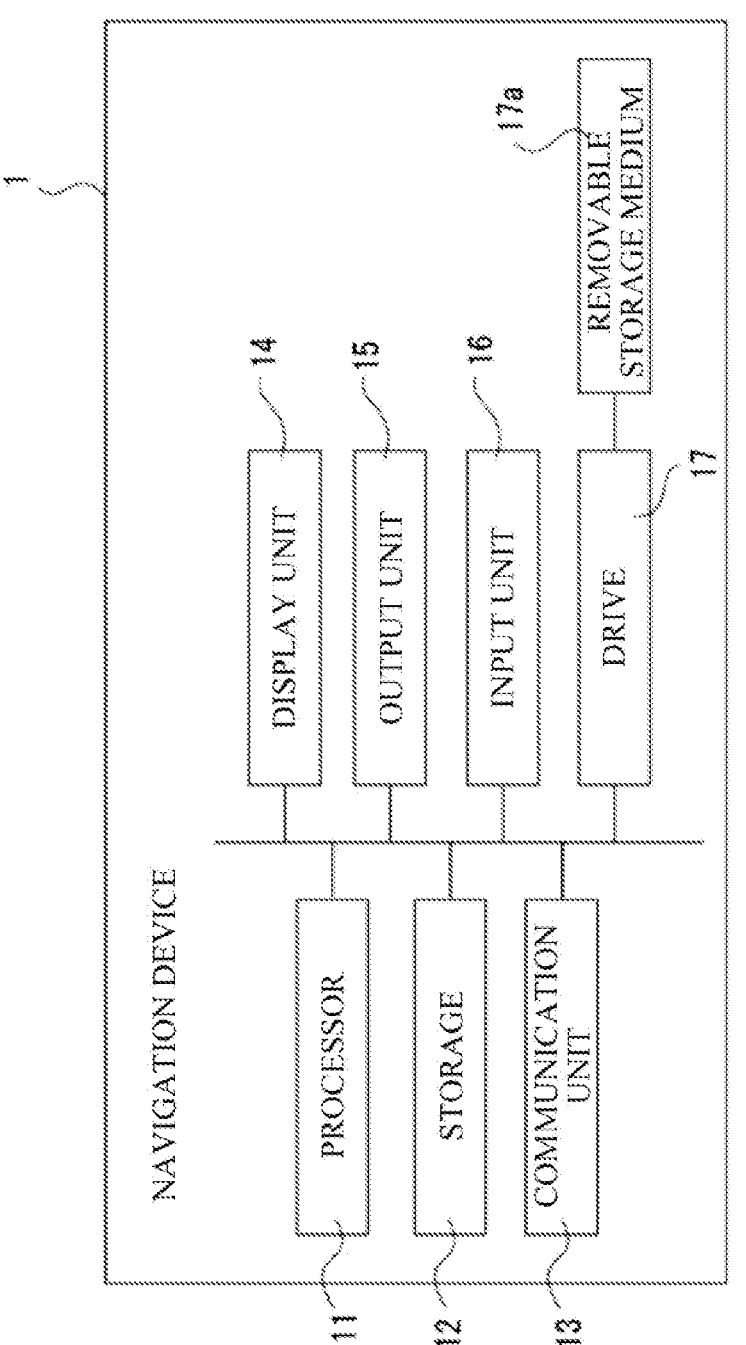
FIG. 2 is a schematic block diagram illustrating a configuration example of a navigation device in the embodiment.

FIG. 2 illustrates a configuration example of the navigation device 1.

The navigation device 1 may include a processor 11, a storage 12, a communication unit 13, a display unit 14, an output unit 15, an input unit 16, and a drive 17. The processor 11 may include, for example, a CPU. The storage 12 may include, for example, a ROM and a RAM, or a hard disk drive (HDD), without limitation.

The processor 11 may perform various kinds of processing described later, to present a user with trip data. Here, a "trip" refers to, for example, a unit of travel of the vehicle 100 from a start of travel to an end of travel.

The "trip data" is data including, for example, time data, i.e., date and hour data, positional data, travel distance data, travel speed data, vehicle data, and image data, without limitation. The "trip data" is data indicating when and where which vehicle the user visited by. As the time data, the trip data may include, for example, a date and time of a start of a trip, and a date and time of an end of the trip, or time when the vehicle has passed through each point on a travel course. The positional data may include, for example, positional data regarding a starting point of travel, an end point of travel, and each point along the travel course.

In this embodiment, when the user replaces the vehicle 100, the trip data acquired by the navigation device 1 of the vehicle 100 before the replacement is presented in the navigation device 1 of the vehicle 100 after the replacement.

In the following description, the vehicle 100 before the replacement is referred to as a vehicle 100A, and the vehicle 100 after the replacement is referred to as a vehicle 100B. When the user owns two vehicles 100, one vehicle 100 may be referred to as the vehicle 100A, and the other vehicle 100 may be referred to as the vehicle 100B. That is, the vehicle 100A and the vehicle 100B are not limited to the vehicles 100 before and after the replacement.

When the vehicle 100A and the vehicle 100B are not distinguished from each other, they each are simply referred to as the "vehicle 100".

The processor 11 may present the trip data to the user, to present the user with appropriate information.

The storage 12 may hold, for example, programs and data necessary when the processor 11 performs various kinds of processing. The storage 12 may also hold, for example, the trip data generated by the vehicle 100A, and the trip data generated by the vehicle 100B. The vehicle 100B is also referred to as the vehicle.

The communication unit 13 may perform data communication between the navigation device 1 and a server device 200 described later, by various kinds of wireless communication. The communication unit 13 may also perform data communication with a user terminal 300 such as a smartphone owned by the user, by short-range wireless communication.

The communication unit 13 may perform a process of receiving the trip data generated in the vehicle 100A, from the server device 200. In one embodiment of the disclosure, the vehicle 100A may serve as a "random vehicle".

The communication unit 13 may also perform a process of transmitting, or uploading, the trip data generated in the vehicle 100B, to the server device 200. In one embodiment of the disclosure, the vehicle 100B may serve as a "vehicle".

The display unit 14 may be provided in various ways, such as a multi-function display (MFD), a center information display (CID), or a head-up display (HUD) including, for example, a liquid crystal display (LCD) or an organic electro-luminescence (EL) panel.

On the display unit 14, for example, various kinds of navigation information and the trip data may be displayed. Moreover, data in a removable storage medium 17a read by the drive 17, e.g., data regarding a music piece being played back, may be displayed.

The display unit 14 may be provided as an external display device outside the navigation device 1.

The output unit 15 may be provided as, for example, an audio output unit as a speaker. The output unit 15 may output, as a sound, for example, various kinds of instruction information as the navigation information.

The input unit 16 may include, for example, keys, dials, touch screens, remote controllers, and various operators and operation devices related to voice input. An operation signal based on an operation detected by the input unit 16 may be interpreted by the processor 11.

The drive 17 may read data from a medium such as a magnetic disk, an optical disk, a magneto-optical disk, or a semiconductor memory mounted as the removable storage medium 17a, and output the data to the processor 11.

Figure 3:
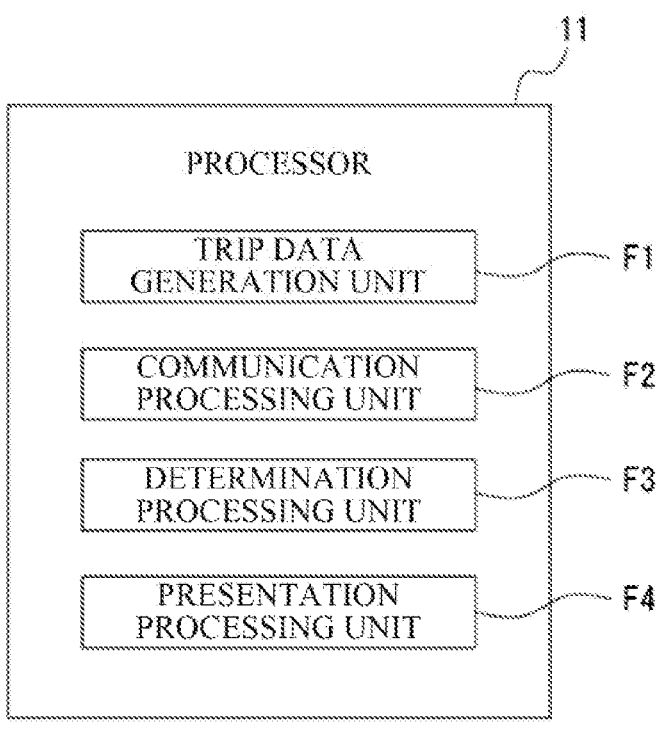
FIG. 3 is a schematic block diagram of a control unit of the navigation device in the embodiment.

FIG. 3 illustrates an example of a configuration of the processor 11.

The processor 11 may serve as various subunits by executing the programs.

In one example, the processor 11 may serve as a trip data generation unit F1, a communication processing unit F2, a determination processing unit F3, and a presentation processing unit F4.

The trip data generation unit F1 may perform a process of generating the trip data. The trip data may include data regarding, for example, tourist sites and restaurants visited by the user by the vehicle 100. Timing at which the trip data is generated may be timing at which the ignition switch is turned off by the user's operation, timing at which a predetermined period of time has elapsed since the vehicle 100 stopped, or timing at which the select lever of the vehicle 100 is moved to a parking position.

Moreover, the trip data to be generated by the trip data generation unit F1 may be data including images obtained by capturing, for example, scenery in the tourist sites, and food and beverages at the restaurants. The images may include, for example, still images and moving images.

In such cases, the trip data generation unit F1 may generate the trip data at timing at which the user who has finished sightseeing or eating and drinking returns to the vehicle 100 and turns on the ignition switch. The generated trip data may include images acquired from a storage of the smartphone by communication between the communication unit 13 and the smartphone as the user terminal 300 carried by the user.

The image data may be included in the trip data by adding the image data to the already generated trip data.

The communication processing unit F2 may receive the trip data from the server device 200 to acquire the trip data generated in the vehicle 100A. In one embodiment of the disclosure, the vehicle 100A may serve as the "random vehicle".

The communication processing unit F2 may also perform a process of transmitting the trip data generated in the vehicle 100B as the vehicle after the replacement, to the server device 200.

The determination processing unit F3 may performs various determination processes related to the generation of the trip data or the presentation of the trip data.

In one example, the determination processing unit F3 may determine the timing of the generation of the trip data. The determination processing unit F3 may also determine whether or not to communicate with the server device 200. Furthermore, the determination processing unit F3 may determine the timing of the presentation of the trip data.

Details of the determination processes are described later.

The presentation processing unit F4 may present the trip data to the user, or an occupant, by displaying the trip data on the display unit 14.

Figure 4:
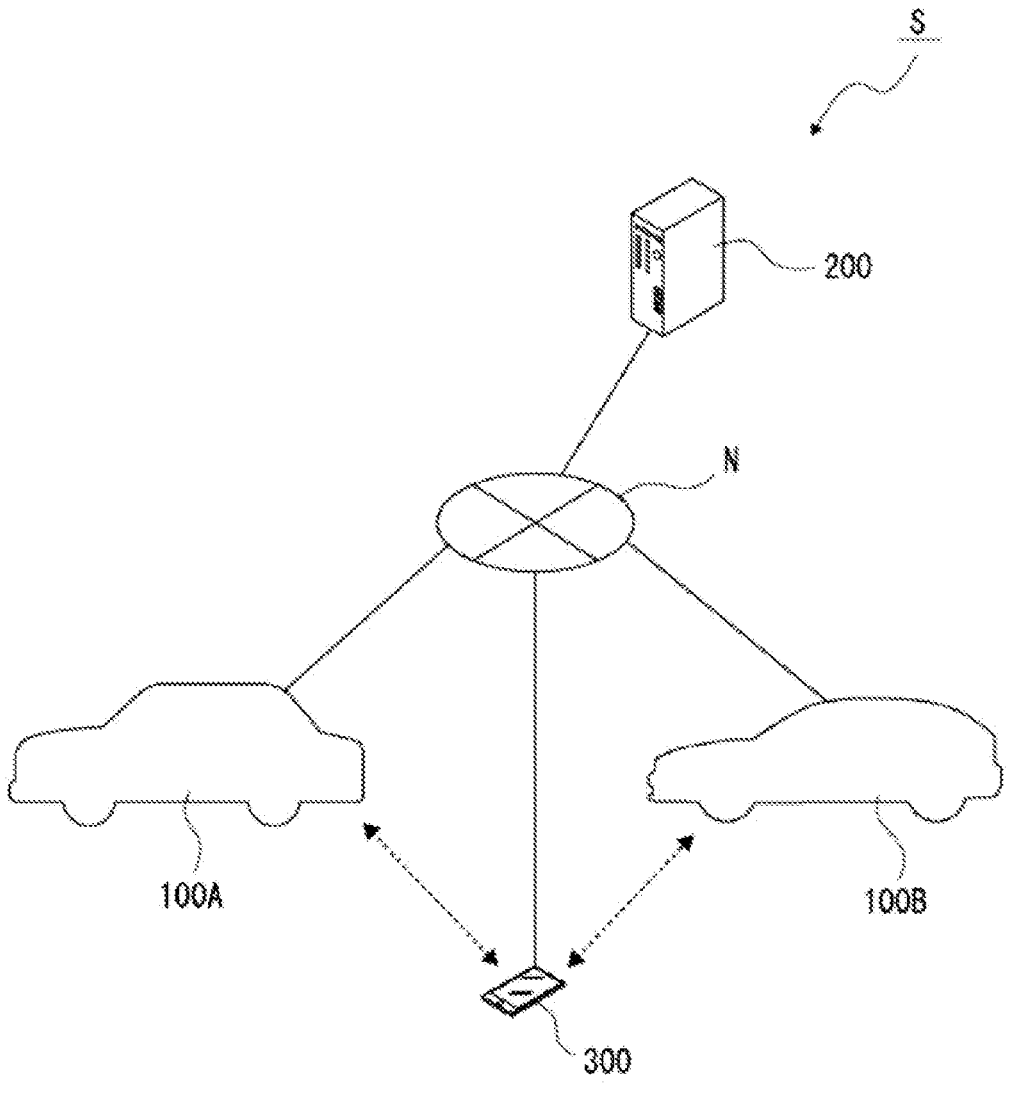
FIG. 4 illustrates an example of a coupling state of devices included in a travel history management system according to the embodiment.

FIG. 4 illustrates an example of a travel history management system S including the vehicles 100 and the server device 200.

The vehicle 100A and the vehicle 100B are configured to be coupled to the server device 200 through a communication network N.

The user terminal 300 such as a smartphone or a tablet terminal may be also coupled to the communication network N.

There are no particular limitation on a configuration of the communication network N. The communication network N may possibly include various kinds of communication networks such as a mobile telephone network, a mobile communication network, a satellite communication network, the Internet, an intranet, and an extranet.

The server device 200 may include a data processor including, for example, a CPU, a ROM, a RAM, an input and output unit, and a communication unit.

The server device 200 may manage the trip data generated by each of the vehicles 100, and receive the trip data from the vehicles 100 and transmit the trip data to the vehicles 100 as necessary.

The user terminal 300 may include a data processor including, for example, a CPU, a ROM, a RAM, an input and output unit, and a communication unit.

The user terminal 300 is configured to communicate with the vehicles 100A and 100B, and the server device 200 through the communication network N.

Moreover, as indicated by an arrowed broken line in FIG. 4, the user terminal 300 may be configured to establish direct communication with the vehicle 100A or the vehicle 100B by short-range wireless communication.

In the following, description is given of a flow in which the trip data is generated in the vehicle 100A before the replacement, and the trip data is uploaded to the server device 200. Next, description is given of a flow in which the vehicle 100B after the replacement downloads the trip data from the server device 200 and presents the trip data to the user.

Figure 5:
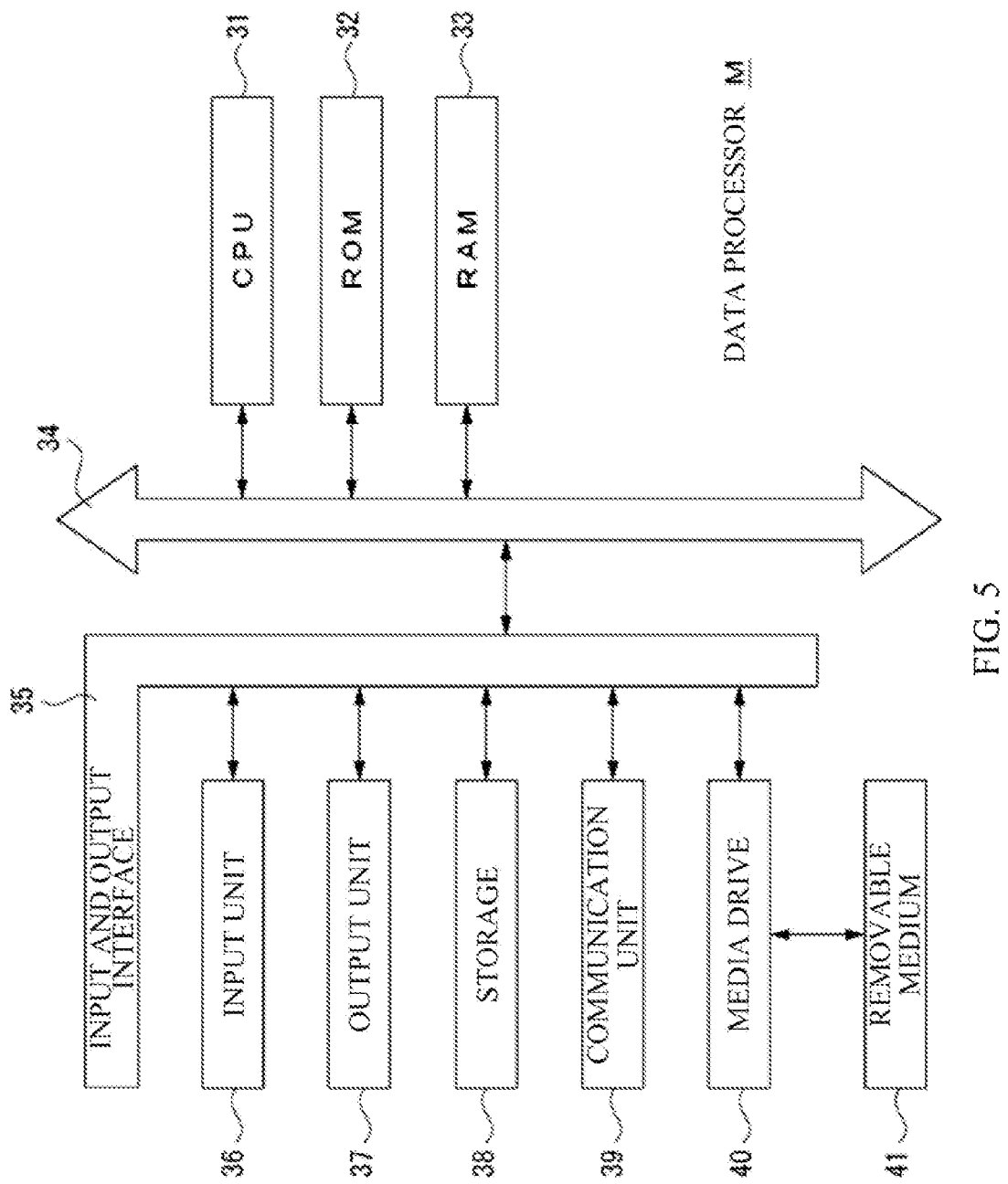
FIG. 5 is a schematic block diagram illustrating a configuration example of a data processor in the embodiment.

FIG. 5 illustrates a configuration example of a data processor M that may serve as the server device 200 or the user terminal 300.

The data processor M may include, for example, a CPU 31, a ROM 32, a RAM 33, a bus 34, an input and output interface 35, an input unit 36, an output unit 37, a storage 38, a communication unit 39, and a media drive 40.

The CPU 31 may carry out various kinds of processing in accordance with programs held in the ROM 32 or programs loaded into the RAM 33 from the storage 38. The RAM 33 may also hold, for example, data necessary for the CPU 31 to carry out the various kinds of processing.

The CPU 31, the ROM 32, and the RAM 33 may be coupled to one another through the bus 34. The input and output interface 35 may be also coupled to the bus 34.

To the input and output interface 35, the input unit 36, the output unit 37, the storage 38, the communication unit 39, and the media drive 40 may be coupled.

The input unit 36 may include, for example, a keyboard, a mouse, a touch screen, and a microphone.

The output unit 37 may include, for example, a display and a speaker. The display may include, for example, a liquid crystal display (LCD), a cathode ray tube (CRT), and an organic electro-luminescence (EL) panel.

The storage 38 may include, for example, a hard disk drive (HDD), and a flash memory device.

The communication unit 39 may perform communication processing and inter-device communication through the communication network N.

On the media driver 40, a removable medium 41 such as a magnetic disk, an optical disk, a magneto-optical disk, or a semiconductor memory may be mounted as necessary, to write or read data into or from the removable medium 41.

The data processor M is configured to upload and download data and programs by communication by the communication unit 39. The data processor M is also configured to transfer data and programs through the removable medium 41.

The CPU 31 may perform processing operation based on various programs, making it possible to carry out data processing and communication necessary as the data processor M.

The data processor M may include various subunits including, for example, the CPU 31, the ROM 32, and the RAM 33.

Description is given of a flow of processing to be carried out by the processor 11 of the navigation device 1 of the vehicle 100A.

Figure 6:
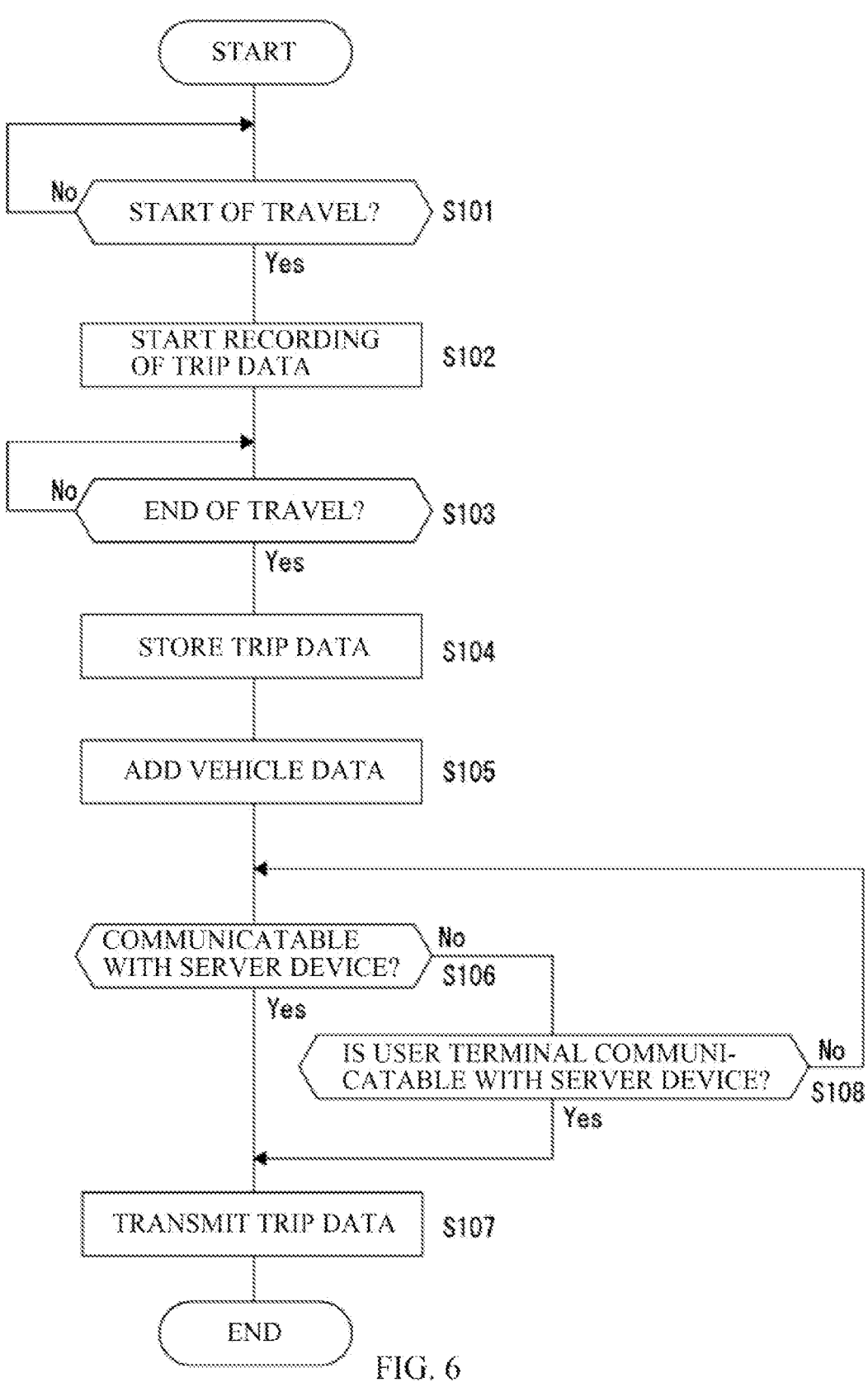
FIG. 6 is a flowchart illustrating an example of processing to be carried out by the navigation device to upload trip data in the embodiment.

FIG. 6 illustrates an example of processing to be carried out when the trip data is uploaded from the navigation device 1 to the server device 200. It is to be noted that some of the processes illustrated in FIG. 6 may be carried out by the vehicle controller 2 of the vehicle 100A.

First, the processor 11 of the navigation device 1 may determine whether or not the travel of the vehicle 100A has started (step S101).

In this determination process, the processor 11 may determine that the vehicle has started traveling when detecting the ignition switch being turned on. Alternatively, the processor 11 may determine that the vehicle has started traveling when detecting a power-on state. The power-on state may include, for example, a state in which a start switch has been pressed, with the brake switch turned on.

In another alternative, the processor 11 may determine that the vehicle has started traveling when detecting the select lever having been moved from the parking position.

In addition, the processor 11 may determine that the vehicle has started traveling when detecting the wheels having started actually moving based on the detection result of the wheel speeds.

When determining that the vehicle 100A has not started traveling (step S101: NO), the processor 11 may carry out the process of step S101 again. That is, the processor 11 may repeatedly carry out the process of step S101 until the processor 11 determines that the travel of the vehicle 100A has been started.

When determining that the vehicle 100A has started traveling (step S101: YES), the processor 11 may start recording of the trip data (step S102).

After starting the recording of the trip data, the processor 11 may determine whether or not the travel of the vehicle 100A has ended (step S103).

As used herein, an "end of travel" does not refer to a stop that is repeated many times because of, for example, traffic lights before the vehicle 100A arrives at the destination, but refers to a stop when the user arrives at the destination or a rest point.

That is, in this determination process, the processor 11 may refrain from determining that the travel of the vehicle has ended, when the vehicle 100A simply stops advancing because the brake switch is turned on.

For example, the processor 11 may determine that the travel has ended when detecting the ignition switch being turned off. Alternatively, the processor 11 may determine that the travel has ended when detecting a power-off state.

In another alternative, the processor 11 may determine that the travel has ended when detecting the select lever having been moved to the parking position. In addition, the processor 11 may determine that the travel has ended when detecting the vehicle 100A having arrived at the destination or a waypoint that has been set in advance.

Furthermore, the processor 11 may determine that the travel has ended when detecting an elapse of a certain period of time since the stop of the vehicle 100A, or when detecting an elapse of a certain period of time since establishment of any of the conditions mentioned above.

Thus, for example, detecting the elapse of the certain period of time, e.g., 10 minutes, since, for example, the stop of the vehicle 100A makes it possible to suppress the processor 11 from determining that the travel has ended when the vehicle 100A is stopped at a place that is not the original destination, for example, when the vehicle 100A is stopped at a vending machine for a short time for the user to buy a drink. Hence, it is possible to appropriately determine that the travel of the vehicle 100A has ended.

When the processor 11 determines that the travel has not ended (step S103: NO), the processor 11 may perform the process of step S103 again. That is, the processor 11 may repeat the process of step S103 until the processor 11 determines that the travel has ended.

When determining that the travel has ended (step S103: YES), the processor 11 may generate the trip data by ending the recording of the trip data and stores the trip data in the storage 12 (step S104).

The trip data to be generated and stored here may be, for example, data in which user identification (ID), the time data, i.e., the date and hour data, data regarding a place the vehicle has arrived at, i.e., the positional data, and the vehicle data are associated with one another. It is to be noted that the user ID exemplifies data with which the user is uniquely identifiable, but this is non-limiting. The trip data may include, for example, a mail address instead of the user ID.

Thereafter, the processor 11 may add the vehicle data to the trip data (step S105).

The vehicle data may include, for example, a name of a vehicle model, a model year, a color of the vehicle, an option code, an image of the vehicle, running time, and images captured by the in-vehicle camera while the vehicle is traveling. The images captured by the in-vehicle camera may include still images or moving images.

When the destination the vehicle has arrived at is, for example, a resort, the vehicle data may include an image of the place prepared in advance. The image about the destination may be associated with the vehicle data later in the server device 200.

The vehicle data may further include data regarding a digital key.

Thereafter, the processor 11 may determine whether or not the processor 11 is communicatable with the server device 200 (step S106). When determining that the processor 11 is communicatable with the server device 200 (step S106: YES), the processor 11 may transmit the trip data to the server device 200 (step S107).

Thus, the server device 200 may perform a process of storing the trip data in a database.

When determining that the processor 11 is not communicatable with the server device 200 (step S106: NO), the processor 11 may determine whether or not the user terminal 300 is communicatable with the server device 200 (step S108). In one example, the processor 11 may request the user terminal 300 to transmit a determination result as to whether or not communication between the user terminal 300 and the server device 200 is available.

When determining that the user terminal 300 is communicatable with the server device 200 (step S108: YES), that is, when obtaining the determination result that the communication through the user terminal 300 is available, the processor 11 may transmit the trip data to the user terminal 300 (step S107). In this way, it is possible for the navigation device 1 to upload the trip data to the server device 200 through the user terminal 300.

When determining that the user terminal 300 is not communicatable with the server device 200 (step S108: NO), that is, when obtaining the determination result that the communication through the user terminal 300 is unavailable, the processor 11 may return to the process of step S106.

It is to be noted that FIG. 6 illustrates an example where the processor 11 repeats the processes of steps S106 and S108 until the processor 11 successfully uploads the trip data to the server device 200. However, this is non-limiting.

For example, when the processor 11 fails in uploading the trip data to the server device 200 even after the processes of steps S106 and S108 are finished a predetermined number of times, the processor 11 may store the trip data generated this time in the storage 12 and be on standby for the transmission of the trip data until the next occasion of the transmission.

Figure 7:
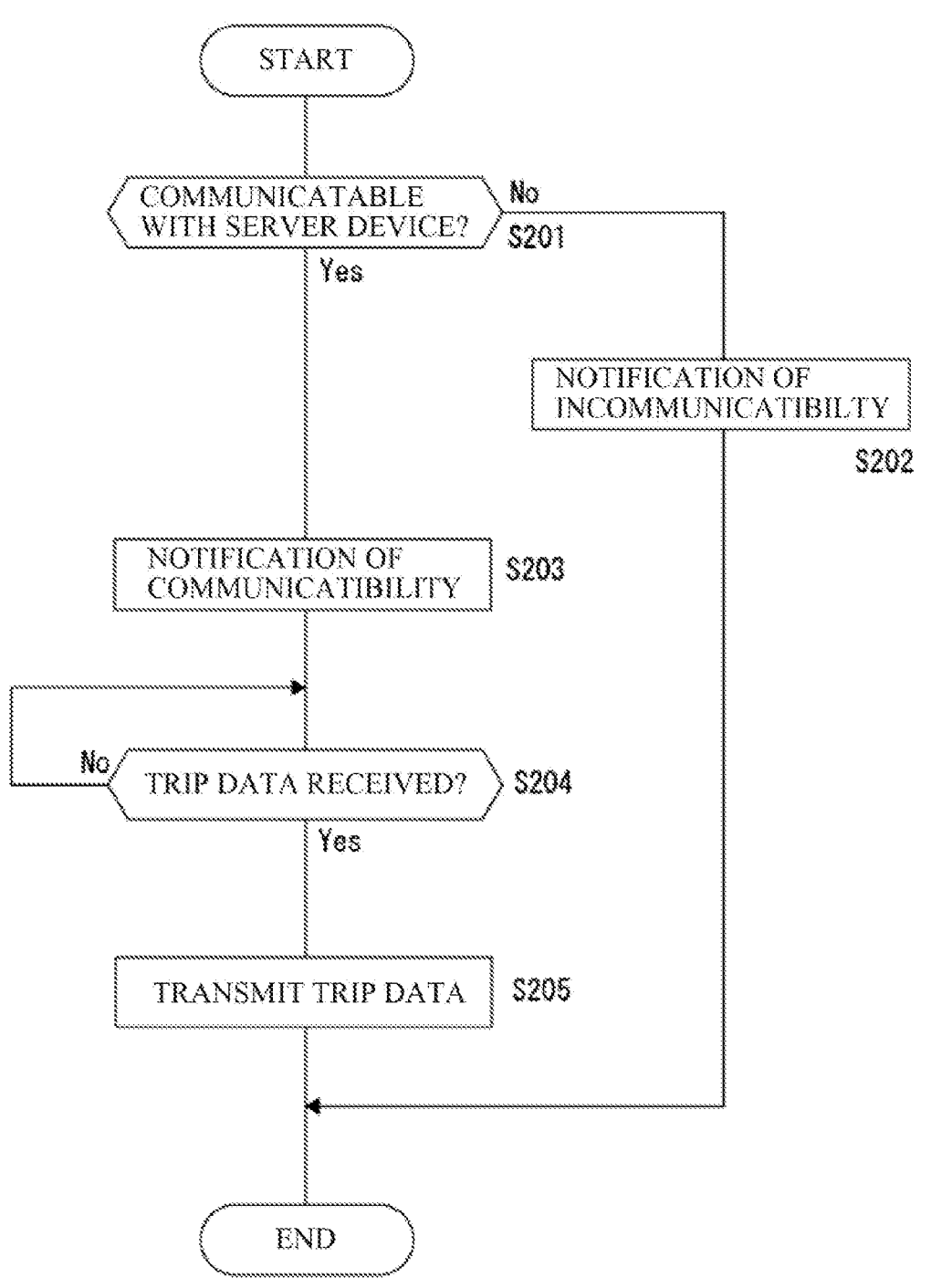
FIG. 7 is a flowchart illustrating an example of processing to be carried out by a user terminal to upload the trip data in the embodiment.

FIG. 7 illustrates an example of processing to be carried out by the CPU 31 of the user terminal 300 in accordance with the series of processes illustrated in FIG. 6 being carried out by the processor 11 of the navigation device 1. The series of processes illustrated in FIG. 7 is an example of the processing to be carried out by the CPU 31 of the user terminal 300, triggered by receipt of the request for the transmission of the determination result as to whether or not the user terminal 300 is communicatable with the server device 200.

Upon receiving the request, the CPU 31 of the user terminal 300 may determine whether or not the user terminal 300 is communicatable with the server device 200 (step S201).

When determining that the user terminal 300 is not communicatable with the server device 200 (step S201: NO), the CPU 31 of the user terminal 300 may notify the navigation device 1 that the user terminal 300 is not communicatable with the server device 200 (step S202), and end the series of processes illustrated in FIG. 7.

When determining that the user terminal 300 is communicatable with the server device 200 (step S201: YES), the CPU 31 of the user terminal 300 may notify the navigation device 1 that the user terminal 300 is communicatable with the server device 200 (step S203).

Thereafter, the CPU 31 of the user terminal 300 may determine whether or not the trip data has been received from the navigation device 1 (step S204). This process is provided for receiving the trip data to be transmitted by the navigation device 1 to the user terminal 300 in step S107 in FIG. 6 when the user terminal 300 notifies the navigation device 1 that the user terminal 300 is communicatable with the server device 200.

When determining that the trip data has not been received (step S204: NO), the CPU 31 of the user terminal 300 may carry out the process of step S204 again. That is, the CPU 31 of the user terminal 300 may repeat the process of step S204 until the trip data is received.

When determining that the trip data has been received (step S204: YES), the CPU 31 of the user terminal 300 may transmit the received trip data to the server device 200 (step S205), and end the series of processes illustrated in FIG. 7.

In this way, the trip data generated by the navigation device 1 may be uploaded to the server device 200 through the user terminal 300.

Description is given of Modification Example 1 of the process of uploading the trip data from the navigation device 1 to the server device 200.

In the example described above, various kinds of data are included in the vehicle data to be transmitted on the occasion of the transmission of the trip data. Modification Example 1 includes reducing a data amount of the vehicle data to be transmitted on the occasion of the transmission of the trip data.

Figure 8:
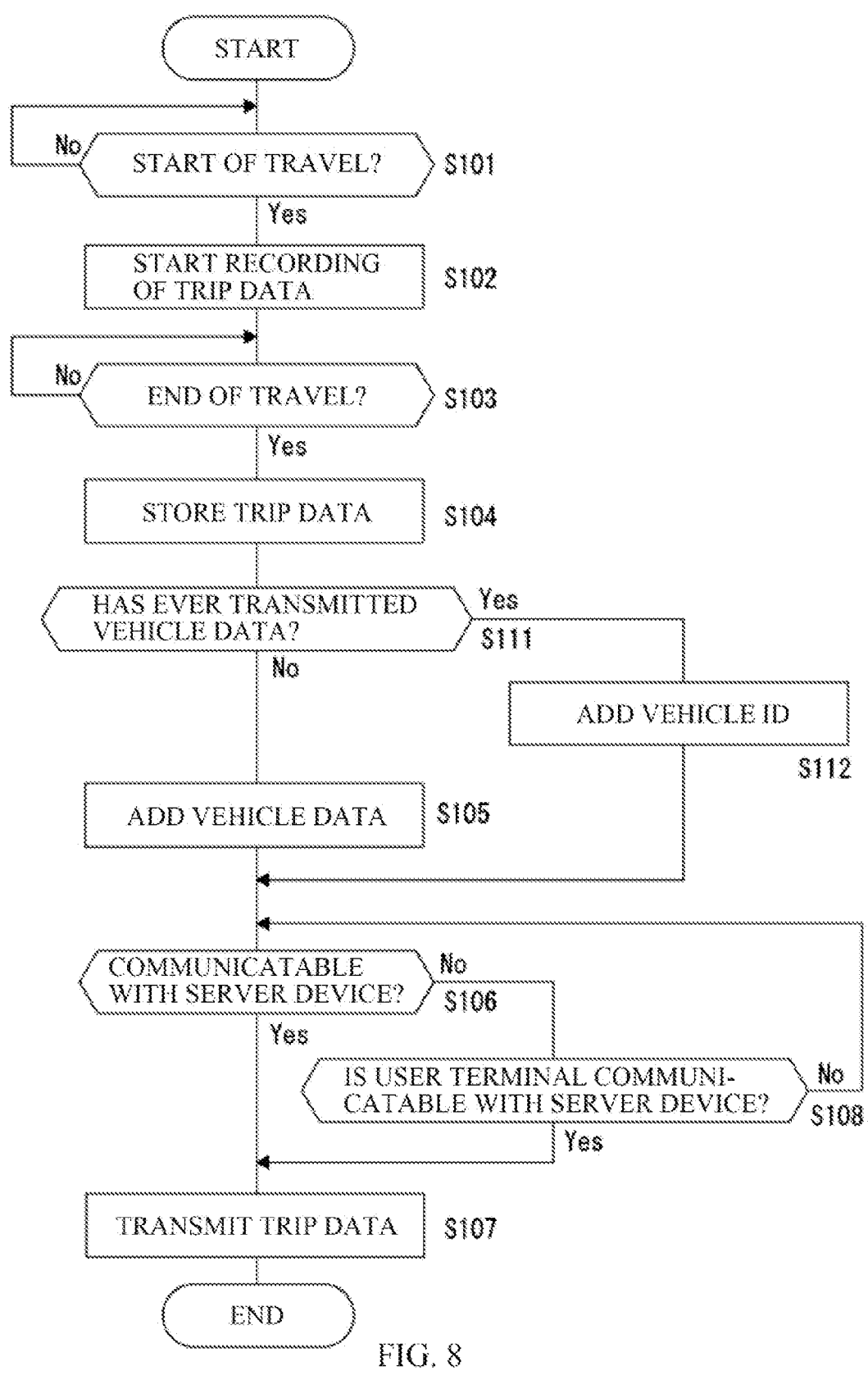
FIG. 8 is a flowchart illustrating an example of processing to be carried out by the navigation device in a modification example of uploading the trip data in the embodiment.

FIG. 8 illustrates an example of processing to be carried out by the processor 11 of the navigation device 1. It is to be noted that similar processes to the steps described above are denoted by the same numerals, and description thereof is omitted as appropriate.

After the determination process as to the start of travel (step S101), the process of starting the recording of the trip data (step S102), and the determination process as to the end of travel (step S103), the processor 11 may store the trip data in the storage 12 (step S104). Thereafter, the processor 11 may determine whether the processor 11 has ever transmitted the vehicle data to the server device 200 (step S111).

For example, when the vehicle 100A transmits the trip data for the first time, the various kinds of data may be transmitted, as the vehicle data, to the server device 200. Non-limiting examples may include the name of the vehicle model, the model year, the color of the vehicle, the optional code, the image of the vehicle, the running time, and the image captured by the in-vehicle camera while the vehicle is traveling. The image captured by the in-vehicle camera may include still images or moving images.

The server device 200 may associate the user ID with the vehicle data, issue a vehicle ID to the vehicle, and give a notification of the vehicle ID to the vehicle 100A. Upon receiving the notification, the vehicle 100A may store the vehicle ID assigned to itself in, for example, the storage 12.

Thus, in the server device 200, various kinds of the vehicle data may be stored in association with the vehicle ID.

When determining that the processor 11 has never transmitted the vehicle data to the server device 200 (step S111: NO), the processor 11 may add the vehicle data to the trip data (step S105). After, for example, the determination as to whether or not the processor 11 is communicatable with the server device 200 (steps S106 and S108), the processor 11 may transmit the trip data (step S107). Thus, the processor 11 may acquire the vehicle ID from the server device 200.

When determining that the processor 11 has ever transmitted the vehicle data to the server device 200 (step S111: YES), the processor 11 may add the previously assigned vehicle ID to the trip data (step S112). After, for example, the determination as to whether or not the processor 11 is communicatable with the server device 200 (steps S106 and S108), the processor 11 may transmit the trip data (step S107).

Thus, only the vehicle ID is added as the vehicle data to the trip data. Hence, it is possible to reduce the data amount of the trip data, leading to reduction in an amount of communication.

In Modification Example 2, the trip data may include image data regarding images captured by the user. In one example, when the user stops the vehicle 100A, gets out of the vehicle, takes pictures of the scenery or takes pictures of food and beverages the user eats and drinks, and then returns to the vehicle 100A again, the trip data may be uploaded, with the image data regarding the images captured with the user terminal 300 included in the trip data.

Figure 9:
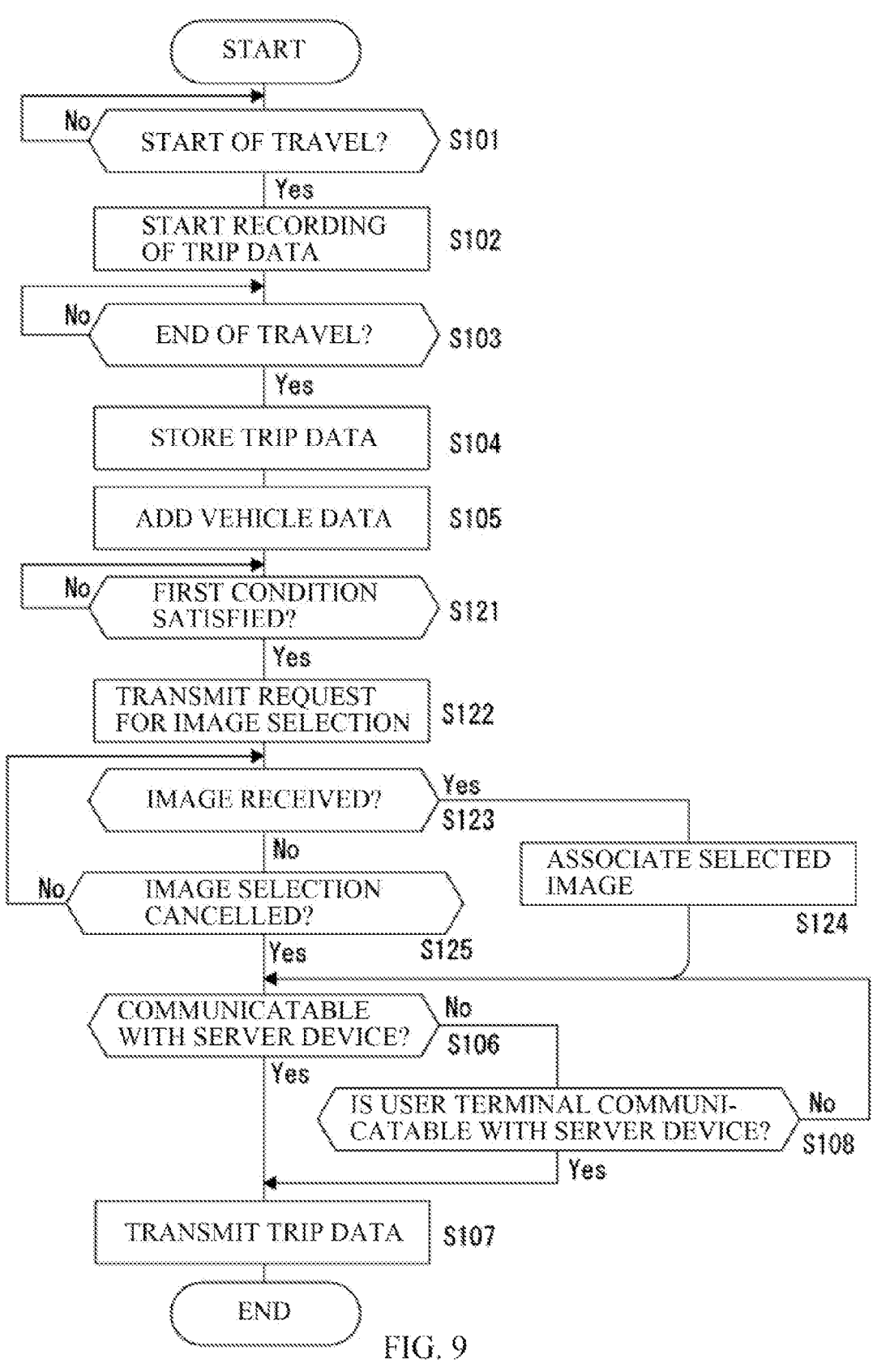
FIG. 9 is a flowchart illustrating an example of processing to be carried out by the navigation device in a modification example of uploading the trip data in the embodiment.

FIG. 9 illustrates an example of processing to be carried out by the processor 11 of the navigation device 1 in Modification Example 2. It is to be noted that similar processes to the steps described above are denoted by the same numerals, and description thereof is omitted as appropriate.

The processor 11 may carry out the processes of steps S101 to S105. Thereafter, the processor 11 may determine whether or not a first condition is satisfied (step S121).

The first condition is a condition to determine presence or absence of possibility that the user has taken a photograph or a moving image.

The first condition may be, for example, that the predetermined period of time has elapsed since the stop of the vehicle 100A, that the user terminal 300 is separated far away from the vehicle 100A, causing disconnection of short-range radio.

When the first condition is not satisfied (step S121: NO), the processor 11 may carry out the process of step S121 again.

Here, when the next travel is started, with the first condition remaining unsatisfied, the processor 11 may carry out a process of uploading the trip data to the server device 200 without including the image data.

When such a first condition is satisfied, that is, when there is possibility that the user has taken a photograph (step S121: YES), the processor 11 may transmit a request for image selection to the user terminal 300 (step S122), assuming that there is possibility that the user has taken a photograph at, for example, the destination.

The request for the image selection may be a process of requesting the user terminal 300 to provide display prompting the user to make a selection from the captured images on the user terminal 300.

After transmitting the request for the image selection, the processor 11 may determine whether or not the image data has been received from the user terminal 300 (step S123).

When determining that the image data has been received (step S123: YES), the processor 11 may associate the data regarding the image selected by the user, that is, the image data received from the user terminal 300, with the trip data (step S124).

After, for example, the determination as to whether or not the processor 11 is communicatable with the server device 200 (steps S106 and S108), the processor 11 may transmit the trip data (step S107).

When determining that the image data has not been received from the user terminal 300 (step S123: NO), the processor 11 may determine whether or not the image selection has been cancelled (step S125). When the user has made an operation to cancel the image selection, the user terminal 300 may transmit data indicating that the image selection has been cancelled. The processor 11 may receive the data and determine that the image selection has been cancelled.

When determining that the image selection has been cancelled (step S125: YES), the processor 11 may transmit, to the server device 200, the trip data including no image data (step S107), after, for example, the determination as to whether or not the processor 11 is communicatable with the server device 200 (steps S106 and S108).

When determining that the image selection has not been cancelled (step S125: NO), the processor 11 may return to the process of step S123.

That is, the processor 11 may repeat the processes of steps S123 and S125 until the image selected by the user is received from the user terminal 300 or the image selection is cancelled by the user's operation.

Figure 10:
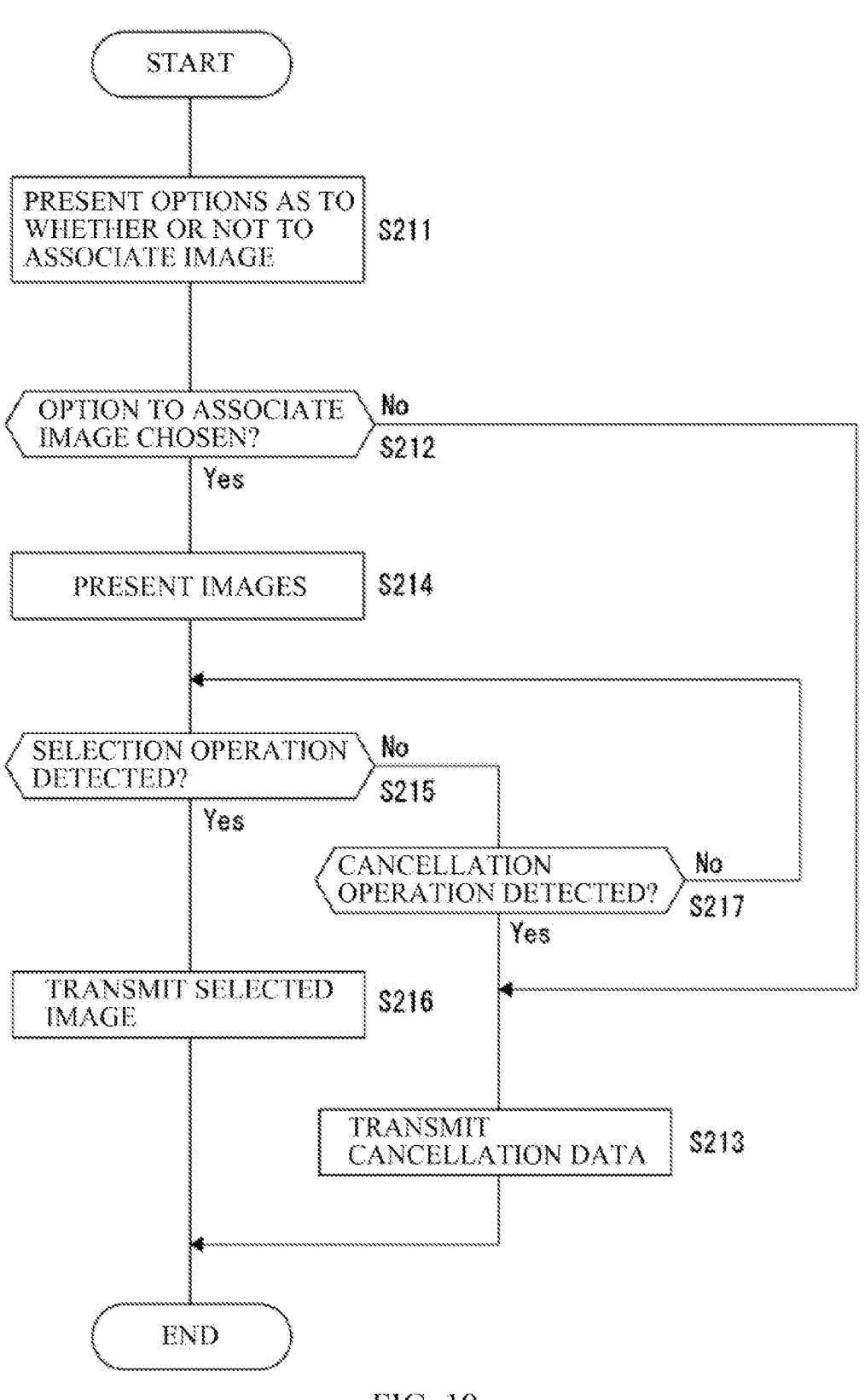
FIG. 10 is a flowchart illustrating an example of processing to be carried out by the user terminal in a modification example of uploading the trip data in the embodiment.

FIG. 10 illustrates an example of processing to be carried out by the CPU 31 of the user terminal 300 in Modification Example 2. The series of processes illustrated in FIG. 10 is an example of the processing to be carried out by the CPU 31 of the user terminal 300, triggered by receipt of the request for the image selection from the navigation device 1.

Upon receiving the request for the image selection from the navigation device 1, the CPU 31 of the user terminal 300 may perform a process of presenting the user with options as to whether or not to associate any images with the trip data (step S211). This process may include, for example, allowing the options to be displayed on the display that serves as the output unit 37 of the user terminal 300.

The CPU 31 of the user terminal 300 may determine, for example, whether or not an option to associate any images with the trip data has been chosen (step S212) as a branching process corresponding to a result of choice from the options presented to the user.

When determining that an option not to associate any images with the trip data has been chosen (step S212: NO), the CPU 31 of the user terminal 300 may transmit cancellation data to the navigation device 1 (step S213). The cancellation data indicates that the image selection has been cancelled. Thus, the CPU 31 of the user terminal 300 may end the series of processes illustrated in FIG. 10.

In response to this, the processor 11 of the navigation device 1 may determine that the image selection has been cancelled in step S125 in FIG. 9.

When determining that the option to associate an image with the trip data has been chosen (step S212: YES), the CPU 31 of the user terminal 300 may display a list of the captured images on the display that serves as the output unit 37, to present the images (step S214).

Thereafter, the CPU 31 of the user terminal 300 may determine whether or not an operation to make the selection from the images has been detected (step S215). When determining that the operation to make the selection from the images has been detected (step S215: YES), the CPU 31 of the user terminal 300 may transmit the selected image to the navigation device 1 (step S216).

When determining that the operation to make the selection from the images has not been detected (step S215: NO), the CPU 31 of the user terminal 300 may determine whether or not the cancellation operation to cancel the image selection has been detected (step S217).

When determining that the cancellation operation has been detected (step S217: YES), the CPU 31 of the user terminal 300 may transmit the cancellation data to the navigation device 1 (step S213). When determining that the cancellation operation has not been detected (step S217: NO), the CPU 31 of the user terminal 300 may return to the process of step S215.

That is, the CPU 31 of the user terminal 300 may repeat the processes of steps S215 and S217 until the selection operation is detected or the cancellation operation is detected.

The navigation device 1 may carry out the series of processes illustrated in FIG. 9, and in accordance therewith, the user terminal 300 may carry out the series of processes illustrated in FIG. 10. This makes it possible to include the image data in the trip data in accordance with the user's operation.

Description is given next of processing to be carried out by the processor 11 of the navigation device 1 and the CPU 31 of the user terminal 300 when the user replaces the vehicle 100A with the new vehicle 100B, and the trip data in the vehicle 100A held in the server device 200 is downloaded to the navigation device 1 of the vehicle 100B.

Figure 11:
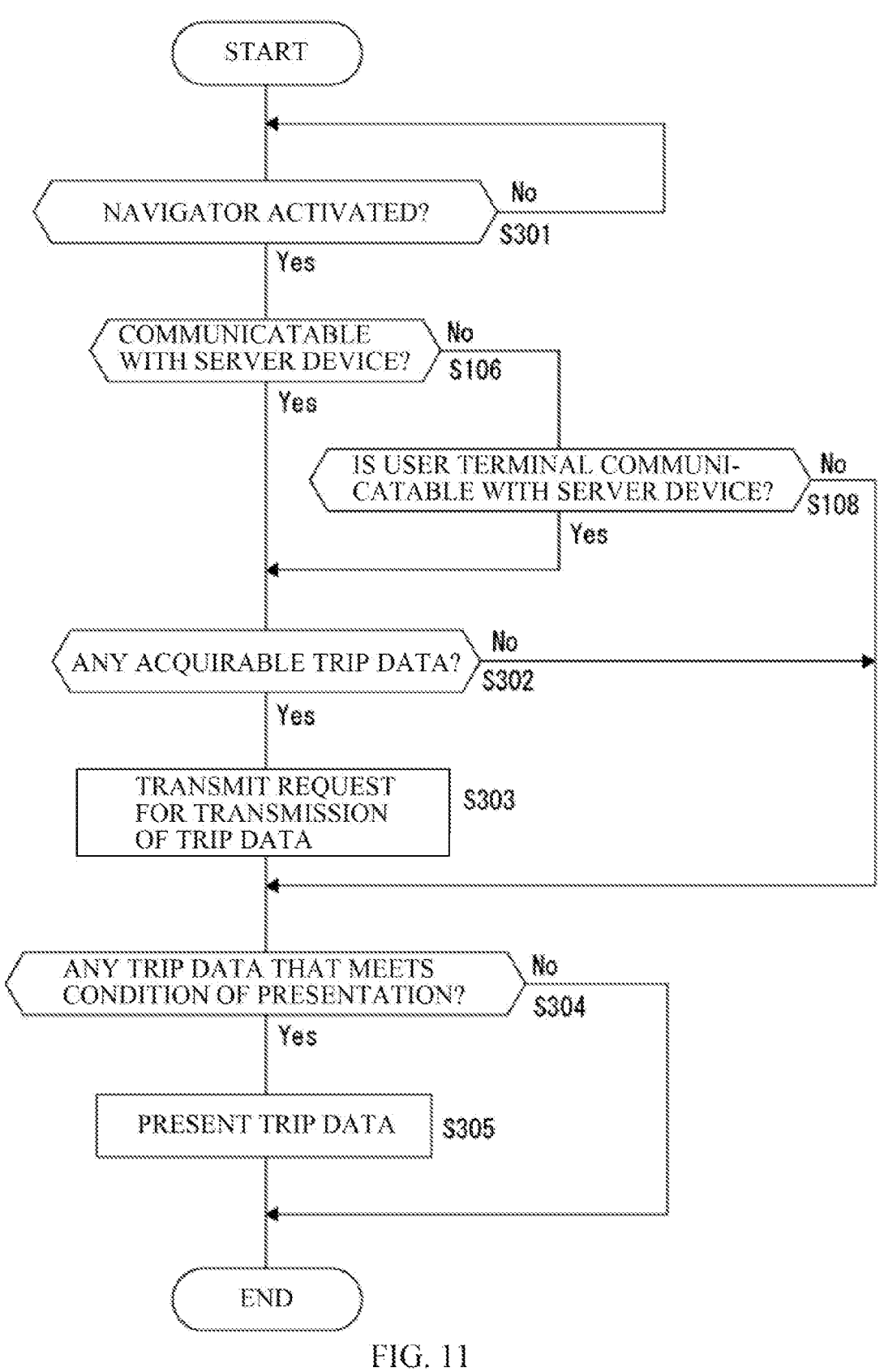
FIG. 11 is a flowchart illustrating an example of processing to be carried out by the navigation device to download the trip data in the embodiment.

FIG. 11 illustrates an example of processing to be carried out by the processor 11 of the navigation device 1. It is to be noted that similar processes to the steps described above are denoted by the same numerals, and description thereof is omitted as appropriate.

First, the processor 11 of the vehicle 100B may determine whether or not a navigator has already been activated (step S301). When determining that the navigator is not activated (step S301: NO), the processor 11 may repeat the process of step S301.

When determining that the navigator has already been activated (step S301: YES), the processor 11 may determine whether or not the processor 11 is communicatable with the server device 200 (step S106). When determining that the processor 11 is not communicatable with the server device 200 (step S106: NO), the processor 11 may determine whether or not the user terminal 300 is communicatable with the server device 200 (step S108).

When determining that the processor 11 is communicatable with the server device 200 (step S106: YES), or when determining that the user terminal 300 is communicatable with the server device 200 (step S108: YES), the processor 11 may determine presence or absence of any acquirable trip data in the server device 200 (step S302).

For example, when any trip data is present that is associated with the user ID of the user and has not been downloaded to the navigation device 1 of the vehicle 100B, the processor 11 may determine that the acquirable trip data is present in the server device 200. It is to be noted that this determination process may be carried out by the server device 200. In this case, it suffices that the navigation device 1 acquires, from the server device 200, a determination result indicating the presence or absence of the acquirable trip data.

When determining that the acquirable trip data is present (step S302: YES), the processor 11 may transmit a request for the transmission of the trip data, to the server device 200 (step S303), and store the trip data thus obtained, in the storage 12. It is to be noted that the processor 11 may transmit the request for the transmission of the trip data, to the server device 200 directly or through the user terminal 300.

When determining that no acquirable trip data is present (step S302: NO), the processor 11 may avoid the process of step S303.

When determining that the user terminal 300 is not communicatable with the server device 200 (step S108: NO), the processor 11 may avoid the processes of steps S302 and S303.

Thereafter, the processor 11 may determine presence or absence of any trip data that meets a condition of presentation (step S304).

Here, the trip data that meets the condition of presentation means the trip data that is meaningful to the user.

Non-limiting examples may include the trip data regarding a place located within a predetermined range from a destination set by the user, and the trip data regarding a place located within a predetermined range from a travel route set by the user.

Such trip data may serve as information that is useful for the user to decide where to visit near the destination of a trip.

When determining that the trip data is present that meets the condition of presentation (step S304: YES), the processor 11 may present the trip data that meets the condition of presentation (step S305), and end the series of processes illustrated in FIG. 11.

When determining that no trip data is present that meets the condition of presentation (step S304: NO), the processor 11 may avoid the process of step S305 and end the series of processes illustrated in FIG. 11.

It is to be noted that, for example, when the user changes the destination or changes the route, the processor 11 may carry out the processes of steps S304 and S305 again.

This allows the processor 11 to determine again the presence or absence of the trip data that meets the condition of presentation, and present the trip data to the user as appropriate.

Figure 12:
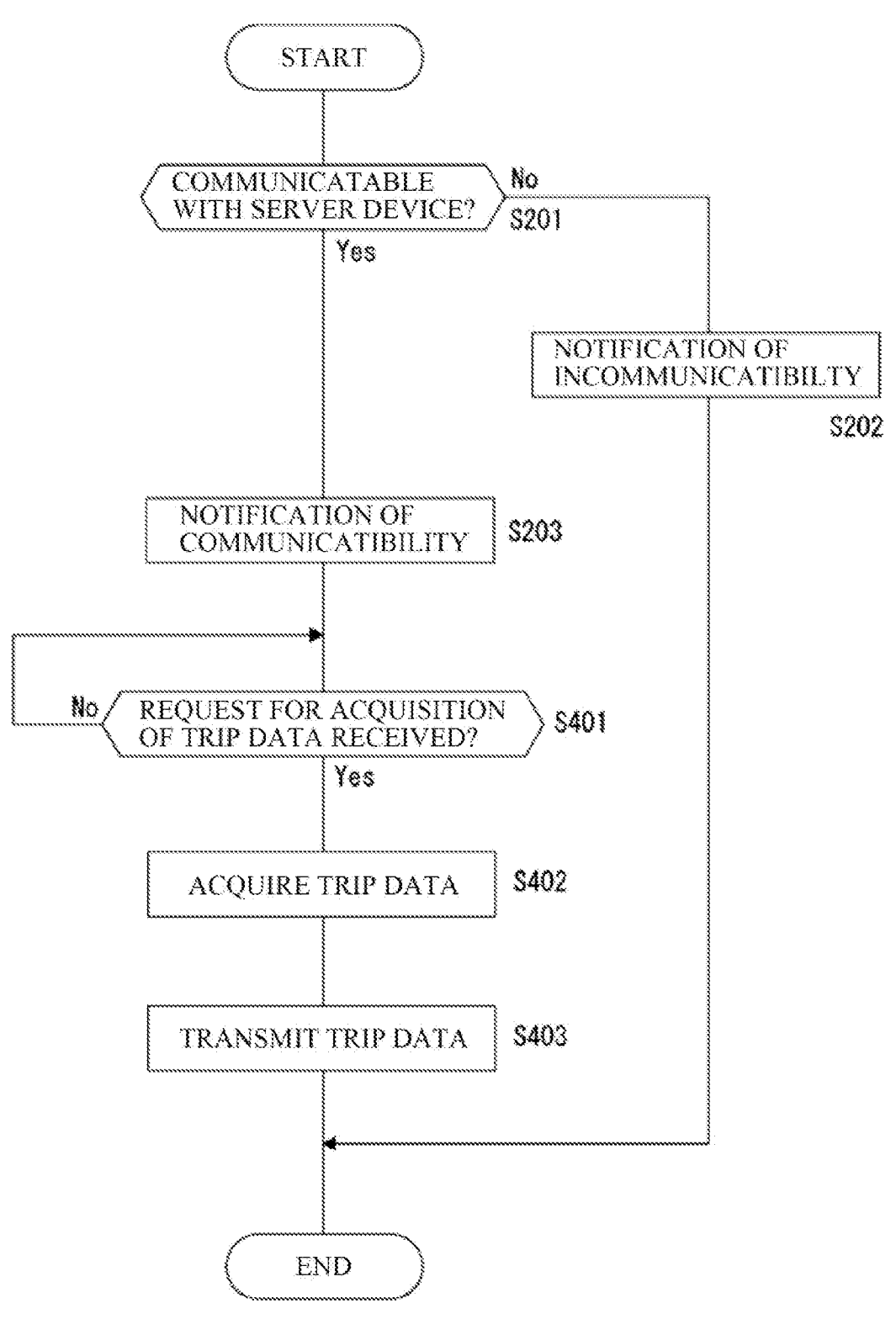
FIG. 12 is a flowchart illustrating an example of processing to be carried out by the user terminal to download the trip data in the embodiment.

FIG. 12 illustrates an example of processing to be carried out by the CPU 31 of the user terminal 300 in accordance with the series of processes illustrated in FIG. 11 to be carried out by the processor 11 of the navigation device 1. The series of processes illustrated in FIG. 12 is an example of the processing to be carried out by the CPU 31 of the user terminal 300, triggered by receipt of the request for the transmission of the determination result as to whether or not the user terminal 300 is communicatable with the server device 200.

It is to be noted that similar processes to the steps described above are denoted by the same numerals, and description thereof is omitted as appropriate.

First, upon receiving the request for the transmission of the determination result as to whether or not the user terminal 300 is communicatable with the server device 200, the CPU 31 of the user terminal 300 may determine whether or not the user terminal 300 is communicatable with the server device 200 (step S201).

When determining that the user terminal 300 is not communicatable with the server device 200 (step S201: NO), the CPU 31 of the user terminal 300 may notify the navigation device 1 that the user terminal 300 is not communicatable with the server device 200 (step S202), and end the series of processes illustrated in FIG. 12.

When determining that the user terminal 300 is communicatable with the server device 200 (step S201: YES), the CPU 31 of the user terminal 300 may notify the navigation device 1 that the user terminal 300 is communicatable with the server device 200 (step S203).

Thereafter, the CPU 31 of the user terminal 300 may determine whether or not a request for acquisition of the trip data has been received (step S401). The request for the acquisition of the trip data is data to be transmitted from the navigation device 1 to the user terminal 300 by the navigation device 1 carrying out the process of step S303 in FIG. 11 when the navigation device 1 acquires the trip data through the user terminal 300.

When determining that the request for the acquisition of the trip data has not been received (step S401: NO), the CPU 31 of the user terminal 300 may carry out the process of step S401 again.

When determining that the request for the acquisition of the trip data has been received (step S401: YES), the CPU 31 of the user terminal 300 may acquire the trip data from the server device 200 (step S402).

Upon acquiring the trip data, the CPU 31 of the user terminal 300 may transmit the acquired trip data to the navigation device 1 (step S403), and end the series of processes illustrated in FIG. 12.

Thus, it is possible to present the trip data to the user even when the navigation device 1 is not directly communicatable with the server device 200.

Figure 13:
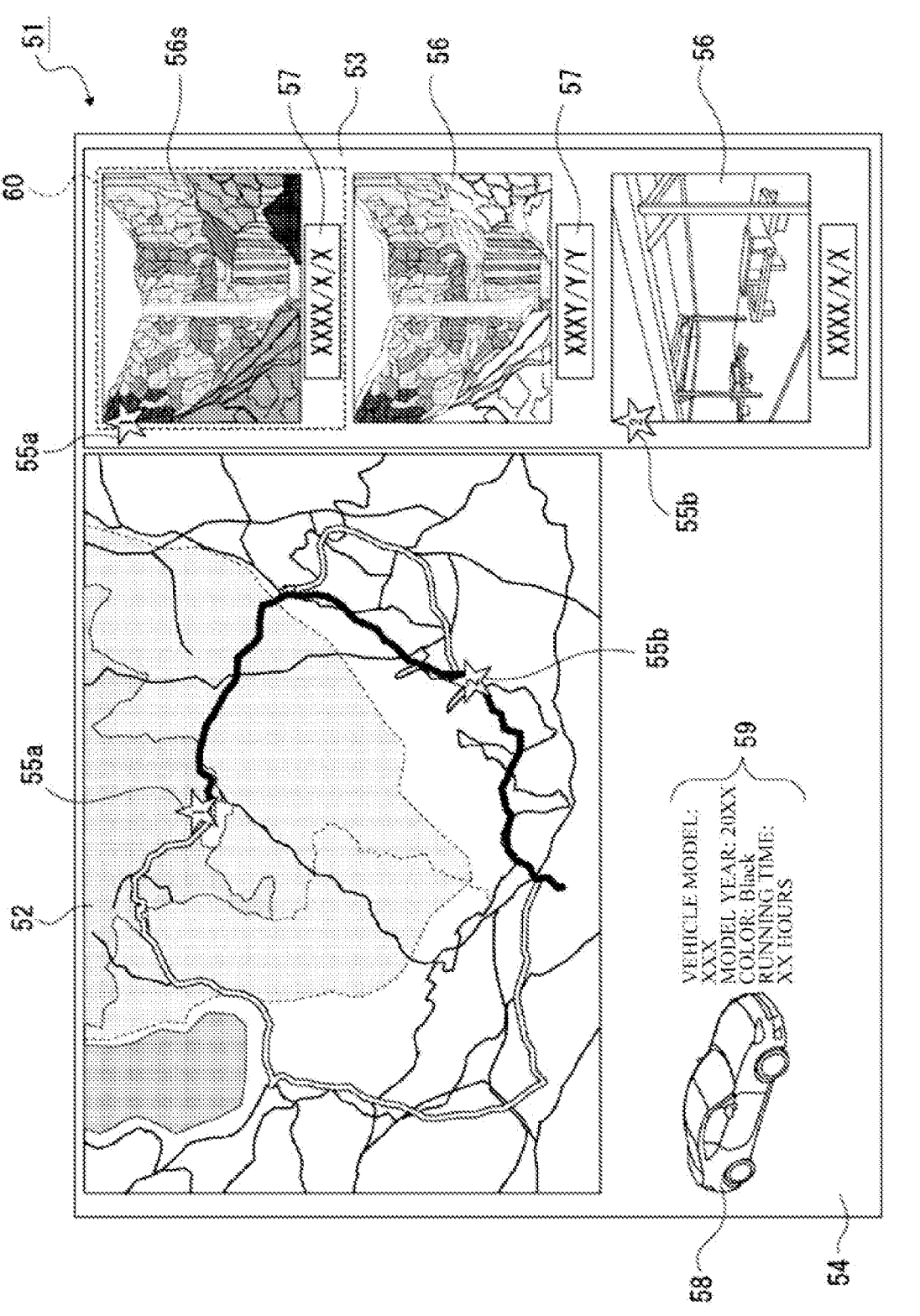
FIG. 13 illustrates a mode of presentation of the trip data in the embodiment.

FIG. 13 illustrates an example of the trip data to be presented to the user.

The trip data may be presented on, for example, the display unit 14 of the navigation device 1. Here, an image displayed on the display unit 14 is referred to as a navigation image 51.

The navigation image 51 may include a map area 52, a trip data display area 53, and a vehicle data display area 54.

In the map area 52, a map may be displayed at a specified scale. In the example in FIG. 13, for example, the current position of the vehicle 100B, a set destination, and a route to the destination may be displayed.

In the map area 52, trip icons 55 may be disposed on the travel route and at the destination. The trip icons 55 are icons given to places to which the captured images and the trip data are related.

In the example in FIG. 13, a first trip icon 55a may be disposed at the destination, and a second trip icon 55b may be disposed on the travel route.

The trip data display area 53 is an area in which the trip data corresponding to the trip icons 55 is displayed. In the example in FIG. 13, two images 56 and respective shooting dates 57 may be displayed for the first trip icon 55a. Moreover, one image 56 may be displayed for the second trip icon 55b.

The user may scroll up and down the trip data display area 53, to display multiple hidden images vertically disposed in the trip data display area 53, as appropriate.

The trip data to be displayed in the trip data display area 53 may be displayed with, for example, a comment, etc. inputted by the user, or other pieces of information.

The images to be displayed in the trip data display area 53 may include not only the images captured with the user terminal 300 but also images captured by the in-vehicle camera of the vehicle 100.

In the vehicle data display area 54, a vehicle image 58 and vehicle data 59 may be displayed. The vehicle image 58 and the vehicle data 59 are related to the vehicle 100 the user is on board on the occasion of the generation of the selected piece of the trip data.

In the example in FIG. 13, from among the images 56 displayed in the trip data display area 53, one image 56s is being selected. On the currently selected image 56s, a rectangular selection icon 60 in a broken line is superimposed.

The vehicle data 59 displayed in the vehicle data displaying area 54 may be data regarding the vehicle 100 the user is on board on the occasion of the capture of the image 56s. That is, as the selected image 56s is switched to other images, the vehicle data 59 to be displayed in the vehicle data display area 54 may change.

It is to be noted that FIG. 13 illustrates an example in which the trip data is displayed on the navigation image 51 of the navigation device 1, but the display mode of the trip data is not limited thereto.

For example, the trip data may be displayed on a display unit 37A that serves as the output unit 37 of the user terminal 300.

Figure 14:
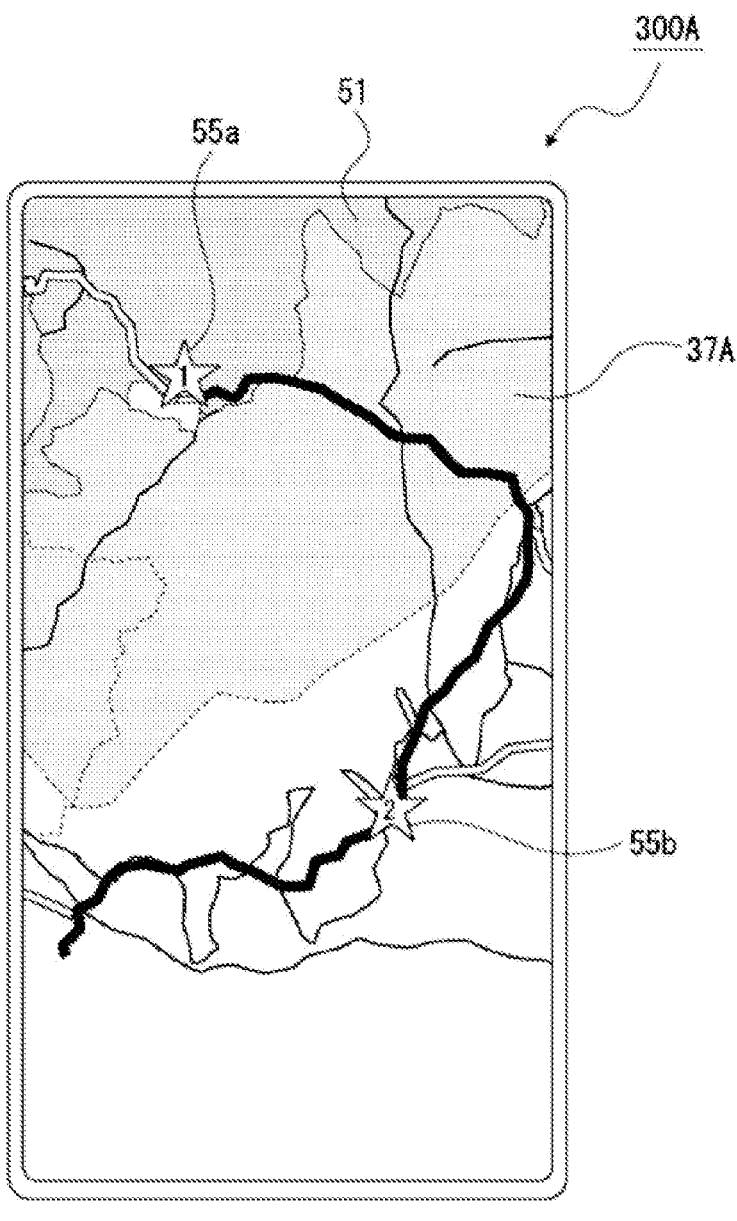
FIG. 14 illustrates another example of the mode of presentation of the trip data in the embodiment.
Figure 15:
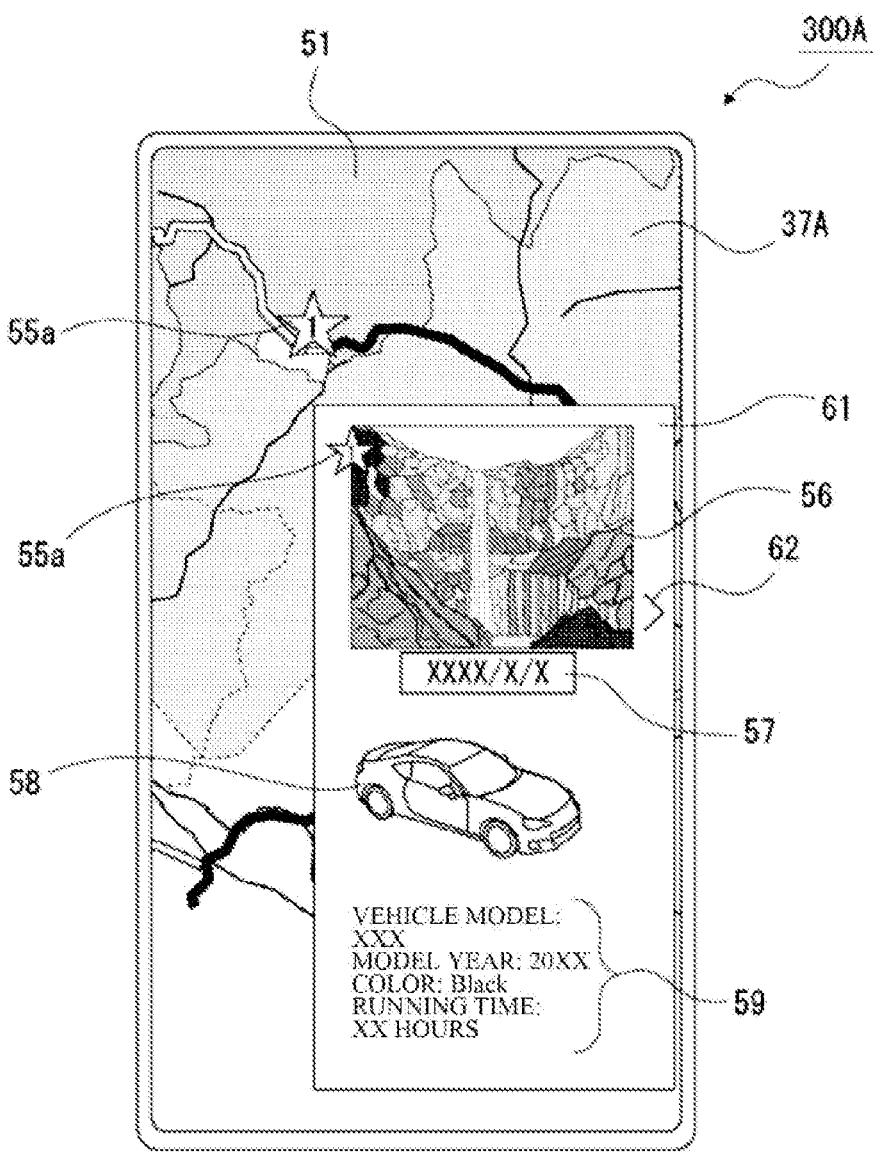
FIG. 15 illustrates another example of the mode of presentation of the trip data in the embodiment.

FIGS. 14 and 15 illustrate such examples.

FIG. 14 illustrates a state in which the navigation image 51 is displayed on the display unit 37A of a smartphone 300A that serves as the user terminal 300.

As illustrated in the figure, in the navigation image 51, the current position, the destination, the travel route to the destination, and the trip icons 55a and 55b may be displayed.

For example, when the user taps the trip icon 55a, as illustrated in FIG. 15, a superposed window 61 may be opened over the navigation image 51.

In the superposed window 61, the selected trip icon 55a, the image 56 captured by the user, the shooting date 57, the vehicle image 58 of the vehicle 100 the user was on board at the time of shooting, and the vehicle data 59 may be displayed.

When there are multiple pieces of the trip data associated with the selected trip icon 55a, an information sending button 62 may be displayed. The information sending button 62 is provided for switching the currently displayed trip data.

When the user taps other portions than the superposed window 61, as illustrated in FIG. 14, the display returns to the state where only the navigation image 51 is displayed.

To realize the display mode as illustrated in FIGS. 14 and 15, it suffices that the processor 11 of the navigation device 1 performs a process of transmitting, to the smartphone 300A, the trip data that meets the condition of presentation, and a process of transmitting a request for a display process, instead of the process of step S305 in FIG. 11.

When receiving the trip data and the request for the display process, the smartphone 300A may perform a process of allowing the display unit 37A of the smartphone 300A to display the navigation image 51 and the trip data as appropriate.

In the first embodiment, an example is described in which the server device 200 manages the trip data in the travel history management system S. In a second embodiment, an example is described in which the user terminal 300 such as a smartphone manages the trip data in place of the server device 200.

Figure 16:
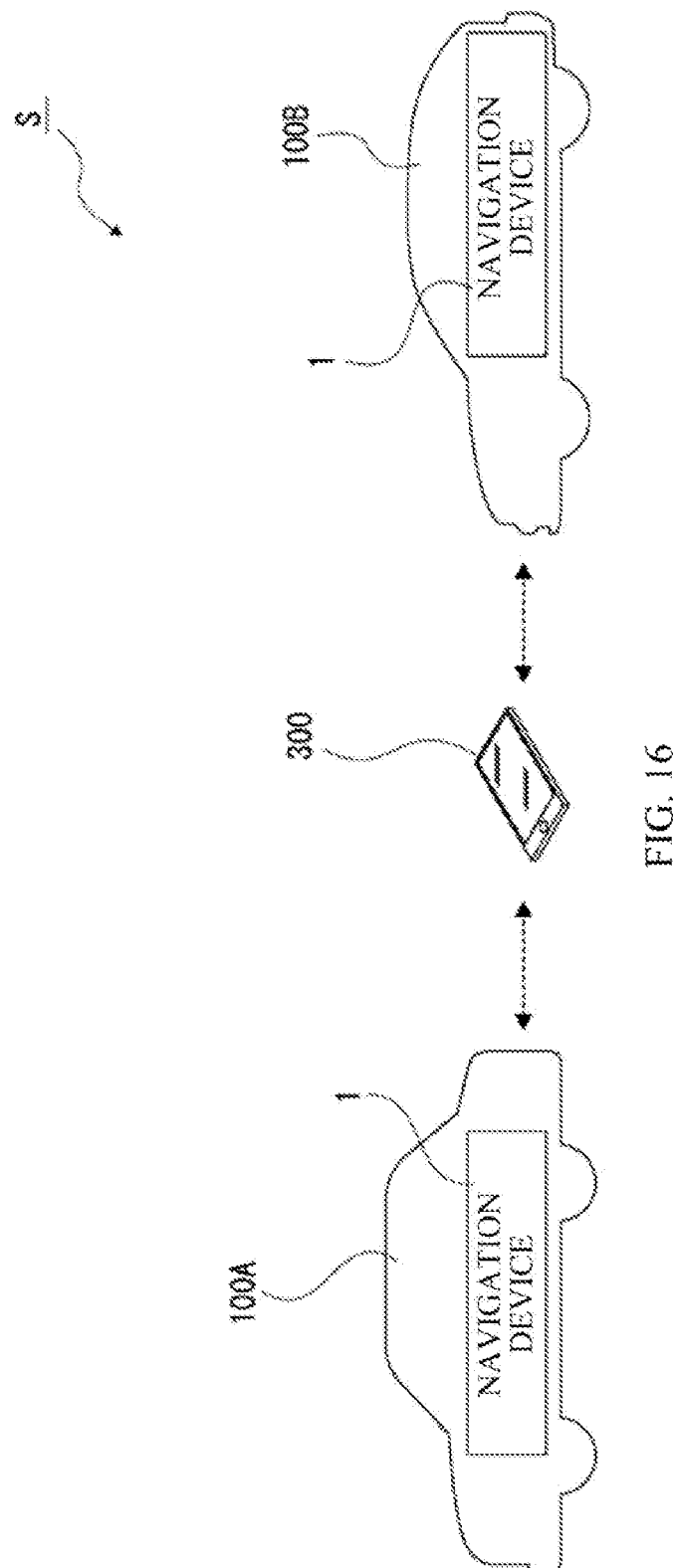
FIG. 16 illustrates an example of a coupling state of devices included in a travel history management system according to an embodiment.

FIG. 16 illustrates a coupling mode between each of the vehicles 100 and the user terminal 300 in the travel history management system S.

As illustrated in the figure, the vehicle 100A before the replacement and the user terminal 300 may be coupled by wireless communication. The vehicle 100B after the replacement and the user terminal 300 may be coupled by wireless communication. It is to be noted that wired communication may be used instead of wireless communication.

The coupling between the vehicle 100A and the user terminal 300, and the coupling between the vehicle 100B and the user terminal 300 may be established by coupling between a communication unit included in the vehicle 100 and the communication unit 39 of the user terminal 300. Alternatively, the coupling between the vehicle 100A and the user terminal 300, and the coupling between the vehicle 100B and the user terminal 300 may be established by coupling between the communication unit 13 of the navigation device 1 of the vehicle 100 and the communication unit 39 of the user terminal 300.

Figure 17:
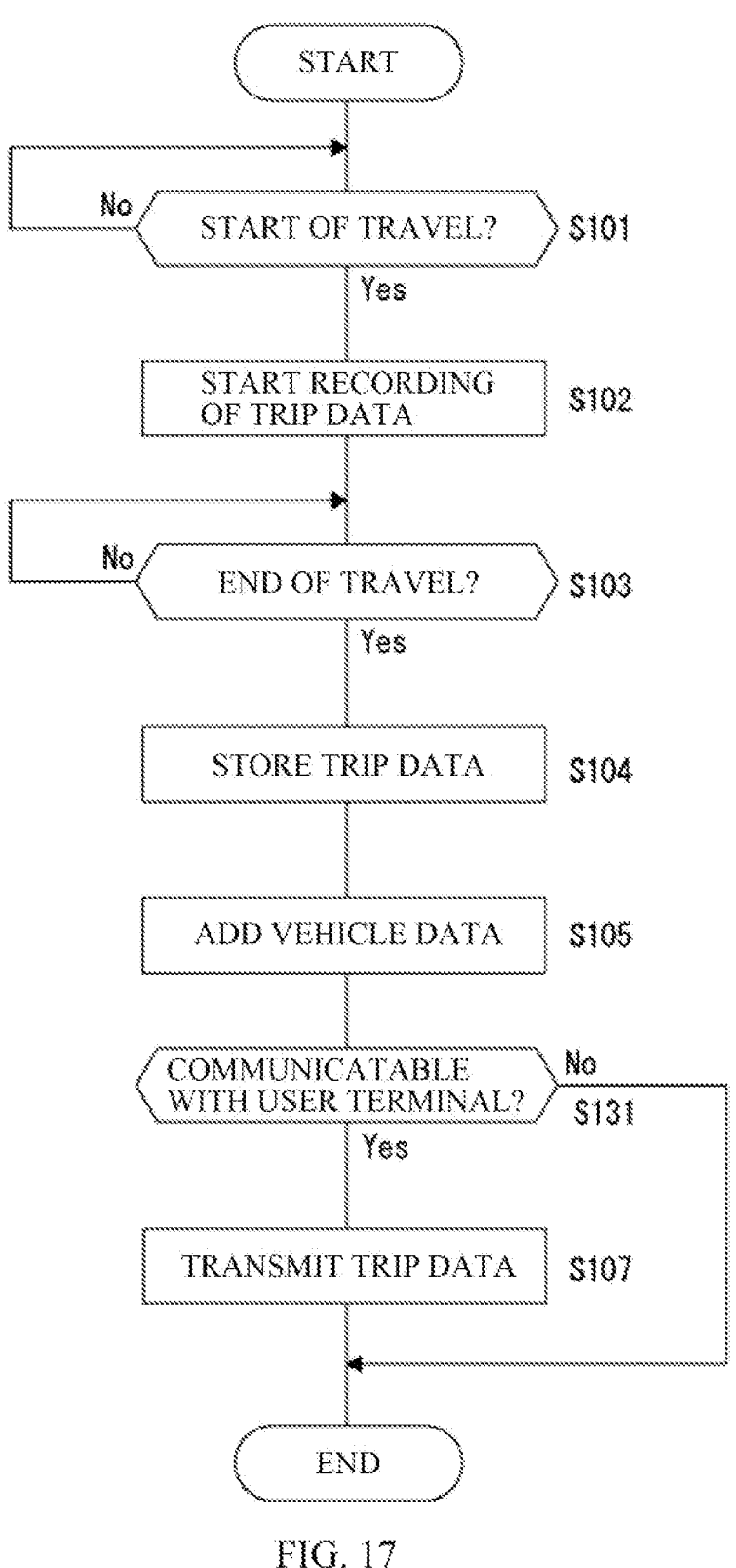
FIG. 17 is a flowchart illustrating an example of processing to be carried out by a navigation device in the embodiment.

FIG. 17 illustrates an example of processing to be carried out by the processor 11 of the navigation device 1 of the vehicle 100A, to allow the user terminal 300 to manage the trip data generated by the vehicle 100A. It is to be noted that similar processes to the steps described above are denoted by the same numerals, and description thereof is omitted as appropriate.

After the determination process as to the start of travel (step S101), the process of starting the recording of the trip data (step S102), and the determination process as to the end of travel (step S103), the processor 11 may store the trip data (step S104), and add the vehicle data to the trip data (step S105).

Thereafter, the processor 11 may determine whether or not the processor 11 is communicatable with the user terminal 300 (step S131).

When determining that the processor 11 is communicatable with the user terminal 300 (step S131: YES), the processor 11 may transmit the trip data to the user terminal 300 (step S107), and end the series of processes illustrated in FIG. 17.

When determining that the processor 11 is not communicatable with the user terminal 300 (step S131: NO), the processor 11 may avoid the process of step S107 and end the series of processes illustrated in FIG. 17. At this occasion, the trip data scheduled to be transmitted may be transmitted to the user terminal 300 on the next occasion of the transmission.

Figure 18:
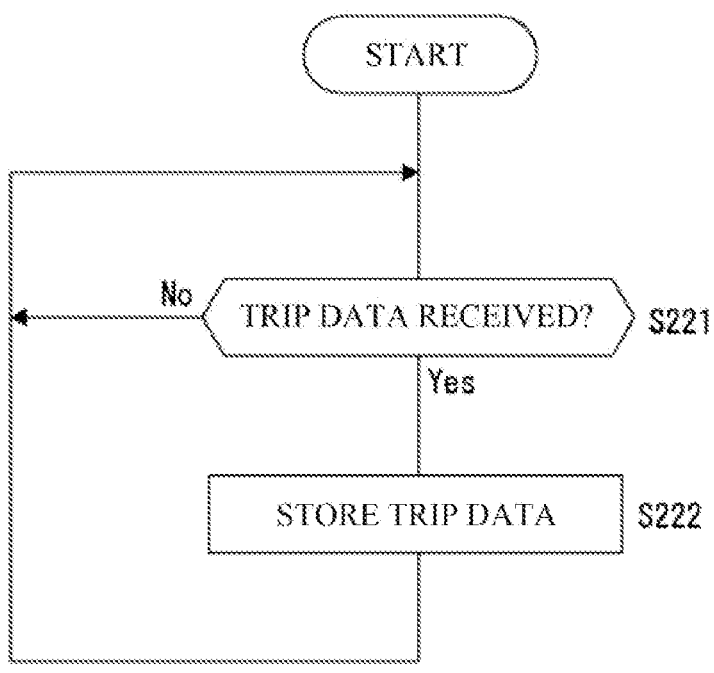
FIG. 18 is a flowchart illustrating an example of processing to be carried out by a user terminal in the embodiment.

FIG. 18 illustrates an example of processing to be carried out by the CPU 31 of the user terminal 300 in response to the transmission of the trip data in step S107.

The CPU 31 of the user terminal 300 may determine whether or not the trip data has been received (step S221). When determining that the trip data has been received (step S221: YES), the CPU 31 of the user terminal 300 may store the received trip data in the storage 38 (step S222). After finishing the process of step S222, the CPU 31 of the user terminal 300 may carry out the process of step S221 again.

It is to be noted that, unlike FIG. 18, the process of step S222 may be triggered by the receipt of the trip data. That is, the CPU 31 of the user terminal 300 does not have to carry out the determination process of step S221.

Figure 19:
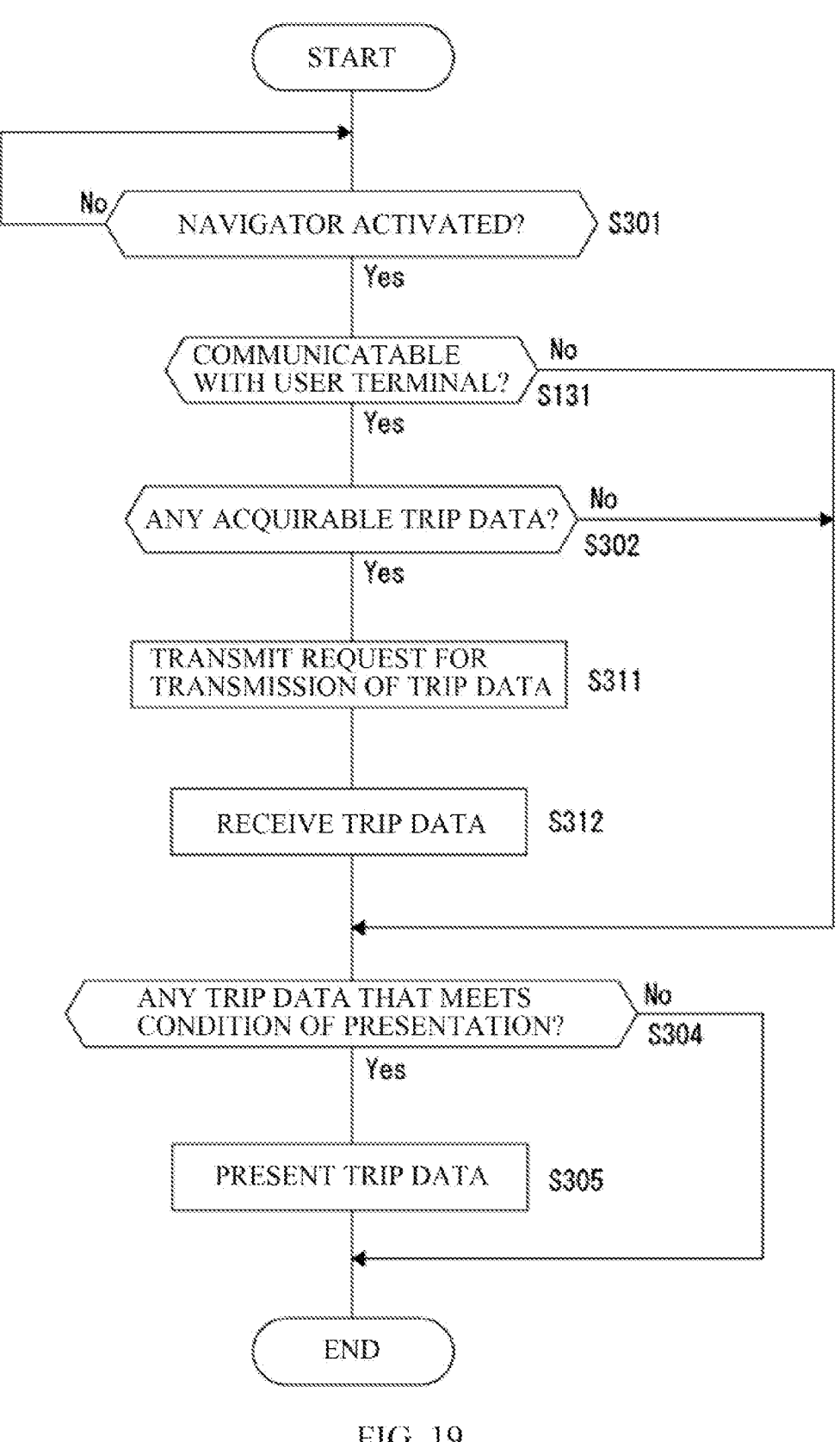
FIG. 19 is a flowchart illustrating an example of processing to be carried out by the navigation device to download trip data in the embodiment.

FIG. 19 illustrates an example of processing to be carried out by the processor 11 of the navigation device 1 of the vehicle 100B, to allow the navigation device 1 of the vehicle 100B to present the trip data generated by the vehicle 100A, when the user replaces the vehicle 100A with the vehicle 100B. It is to be noted that similar processes to the steps described above are denoted by the same numerals, and description thereof is omitted as appropriate.

In step S301, the processor 11 of the navigation device 1 of the vehicle 100B may be on standby for the activation of the navigator. Thereafter, in step S131, the processor 11 of the navigation device 1 of the vehicle 100B may determine whether or not the processor 11 is communicatable with the user terminal 300. When determining that the processor 11 is communicatable with the user terminal 300 (step S131: YES), the processor 11 may determine the presence or absence of any acquirable trip data (step S302).

When determining that the acquirable trip data is present (step S302: YES), the processor 11 may transmit the request for the transmission of the trip data to the user terminal 300 (step S311).

Thereafter, the processor 11 may receive the trip data from the user terminal 300 (step S312).

When determining that the processor 11 is not communicatable with the user terminal 300 (step S131: NO) or when determining that no acquirable trip data is present (step S302: NO), the processor 11 may avoid the processes of steps S311 and S312.

The processor 11 may carry out the processes of steps S304 and S305 to present the trip data to the user. Description of the processes of steps S304 and S305 is omitted.

It is to be noted that the processes of steps S304 and S305 may be carried out when a predetermined condition is satisfied. Non-limiting examples of the predetermined condition may be that the user sets the destination.

Figure 20:
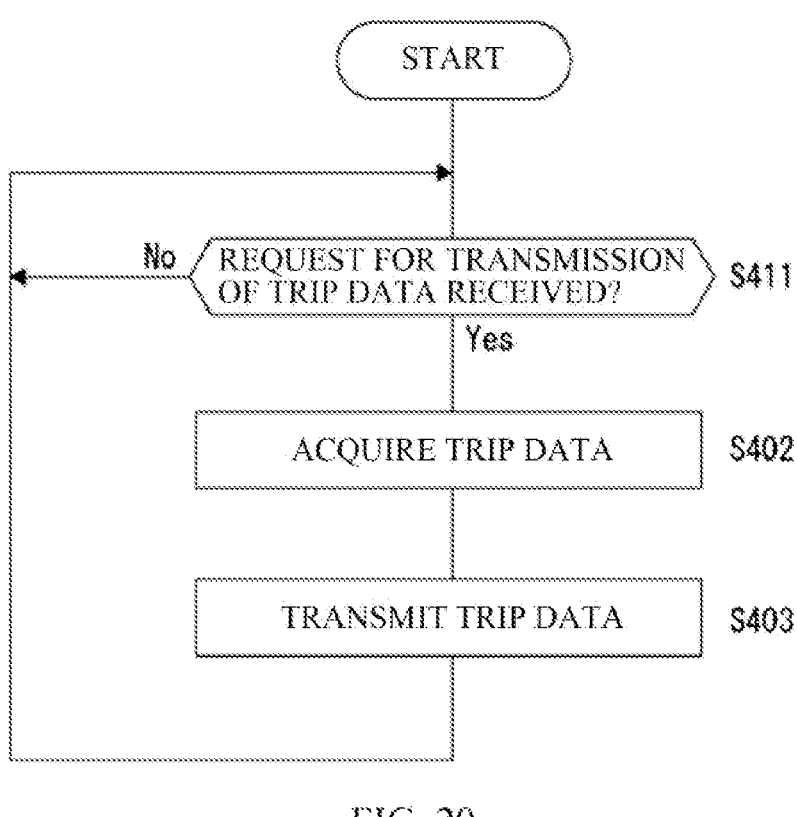
FIG. 20 is a flowchart illustrating an example of processing to be carried out by the user terminal to present the trip data in the embodiment.

FIG. 20 illustrates an example of processing to be carried out by the CPU 31 of the user terminal 300 that has received the request for the transmission of the trip data. It is to be noted that similar processes to the steps described above are denoted by the same numerals, and description thereof is omitted as appropriate.

The CPU 31 of the user terminal 300 may determine whether or not the request for the transmission of the trip data has been received (step S411). When determining that the request for the transmission of the trip data has not been received (step S411: NO), the CPU 31 of the user terminal 300 may carry out the process of step S411 again.

When determining that the request for the transmission of the trip data has been received (step S411: YES), the CPU 31 of the user terminal 300 may acquire the trip data (step S402) and transmit the trip data to the navigation device 1 (step S403).

It is to be noted that, unlike FIG. 20, the processes of steps S402 and S403 may be triggered by the receipt of the request for the transmission of the trip data. That is, the CPU 31 of the user terminal 300 does not have to carry out the determination process of step S411.

In the first and second embodiments described above, an example is described in which the vehicle ID is associated with the user ID. For example, when the vehicle 100A and the vehicle 100B are used by a family, the vehicle ID of the vehicle 100A and the vehicle ID of the vehicle 100B are associated with one user ID given to the family.

In this case, the trip data regarding the places visited by the vehicle 100A and the vehicle 100B is presented to a parent user and a child user as members of the family without distinction.

Here, an example is described in which different user IDs are assigned to respective users.

For example, the parent user and the child user of a certain family each use the vehicle 100A and the vehicle 100B. Moreover, different user IDs are assigned to the parent user and the child user.

Figure 21:
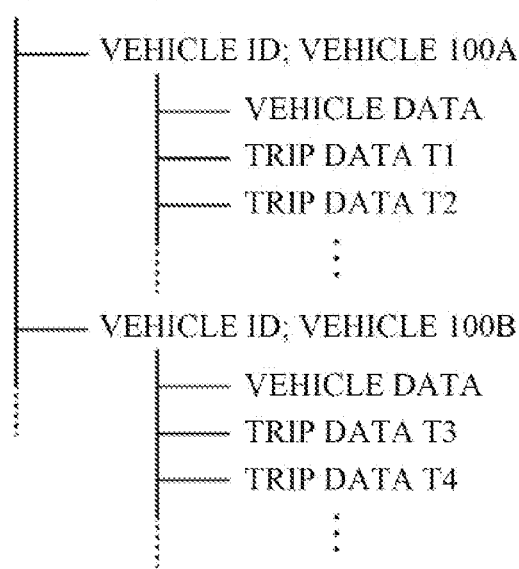
FIG. 21 illustrates a modification example of the trip data to be held in a database in the embodiments.
Figure 21:
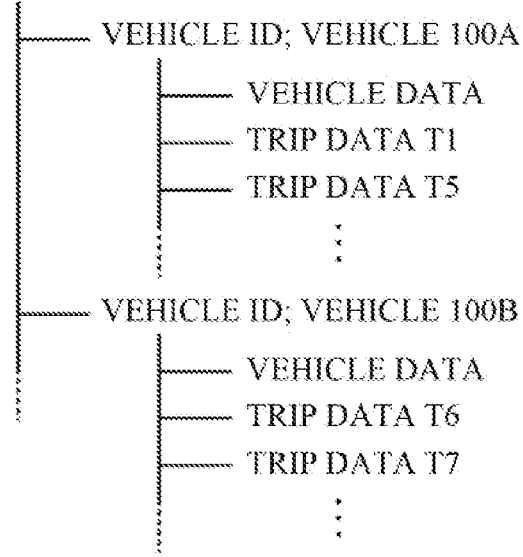

FIG. 21 illustrates a mode of a database to be constructed in the server device 200 in this case.

As illustrated in the figure, the vehicle data and the trip data may be associated with each of the user IDs even in the same family. The trip data may be associated with both the vehicle ID and the user ID.

In one example, the trip data when the parent user travels by the vehicle 100A may be referred to as, for example, the trip data T1 and T2.

Similarly, the trip data when the child user travels by the vehicle 100A may be referred to as, for example, the trip data T1 and T5.

Here, when the parent user replaces the vehicle 100A with the vehicle 100B, the trip data to be downloaded to the navigation device 1 of the vehicle 100B and presented may include the trip data T1 and T2.

When the child user replaces the vehicle 100A with the vehicle 100B, the trip data to be downloaded to the navigation device 1 of the vehicle 100B and presented may include the trip data T1 and T5.

The trip data T1 is the trip data generated when the parent user and the child user went out together. The trip data T2 is the trip data generated when only the parent user went out. The trip data T5 is the trip data generated when only the child user went out.

In this case, it is not preferable from the viewpoint of privacy that the trip data generated when only the child user went out is presented to the parent user.

Constructing the database as illustrated in FIG. 21 in the server device 200 makes it possible to present the user with the appropriate trip data.

Thus, in the process of step S304 in, for example, FIG. 11, when extracting the trip data that meets the condition of presentation, the processor 11 may determine that the trip data associated with not the vehicle ID but the user ID and generated by the vehicle 100A meets the condition of presentation. In one embodiment of the disclosure, the vehicle 100A may serve as the "random vehicle".

In this way, it is possible to present the trip data T1 and T2 to the parent user, and present the trip data T1 and T5 to the child user. This leads to protection of privacy.

As described, the navigation device 1 includes one or more processors, e.g., the processor 11, and a storage medium, e.g., the storage 12. The storage medium contains a program to be executed by the one or more processors. The program includes one or more commands. The one or more commands cause the one or more processors to carry out each of processes.

The processes include: for example, a process of receiving trip data held in a random navigation device, e.g., the navigation device 1 mounted on the vehicle 100A; and a process of displaying the received trip data on a display unit, e.g., the display unit 14 of the navigation device 1 mounted on the vehicle 100B. The process of receiving the trip data may be, for example, the process of step S303 in FIG. 11. The trip data includes positional data and vehicle data regarding a random vehicle on which the random navigation device is mounted, e.g., the vehicle 100A. The positional data may be, for example, the positional data acquired by the GNSS receiver 3.

Thus, for example, on the occasion of the replacement of the vehicle, it is possible to display the old trip data held in the navigation device 1 mounted on the vehicle before the replacement, on the display unit 14 of the navigation device 1 mounted on the new vehicle after the replacement. At this occasion, each piece of the trip data is associated with the vehicle that has acquired the relevant piece of the trip data, making it possible to present the user with the relevant piece of the trip data together with the vehicle data.

Hence, it is possible to present the user with the resorts or the restaurants visited, together with the vehicle data, making it possible to remind the user of, for example, the journey together with memories with the vehicle. That is, it is possible to present useful information to the user.

The trip data to be displayed on the display unit 14 may include the time data, e.g., the date and hour data, or the hour data, regarding the time of the generation of the trip data.

Some users travel in different places and their memories sometimes become ambiguous as to when the user visited each region.

Presenting the user with the time data together with the trip data makes it possible to remind the user of the journey. Hence, it is possible to present the more useful information to the user.

Furthermore, the one or more commands may cause the one or more processors, e.g., the processor 11, to carry out the process of displaying the trip data when a distance from a position identified by the positional data associated with the trip data to a current position of a vehicle, e.g., the current position of the vehicle 100B, is equal to or smaller than a predetermined distance.

This prevents the trip data regarding a place far away from the current position of the vehicle from being presented, while saving a process of presenting information meaningless to the user. This leads to reduction in a processing load. In addition, it is possible to present information meaningful to the user.

Moreover, the one or more commands may cause the one or more processors, e.g., the processor 11, to carry out a process of setting a travel route from a current position of a vehicle, e.g., the current position of the vehicle 100B, to a designated destination, and carry out the process of displaying the trip data when a distance from the travel route to a position identified by the positional data associated with the trip data is equal to or smaller than a predetermined distance.

This renders it unnecessary to present the trip data regarding an irrelevant place to the travel route of the vehicle. Hence, it is possible to reduce the processing load. Moreover, it is possible to present information meaningful to the user.

Furthermore, the trip data may include user identification data with which a user is identifiable, e.g., the user ID. The one or more commands may cause the one or more processors, e.g., the processor 11, to display the trip data including the same user identification data as the user identification data with which a user related to a request for the presentation of the trip data is identifiable, on the display unit, e.g., the display unit 14 of the navigation device 1 mounted on the vehicle 100B.

For example, when the vehicle is shared by the parent user and the child user, it is possible to present only the trip data regarding the place visited by one of the users. In other words, it is possible to change the trip data to be displayed for each user. Hence, it is possible to present appropriate information and protect privacy.

It is to be noted that the user terminal 300 in the second embodiment may possibly receive the trip data generated by various kinds of the navigation devices 1. Moreover, the various kinds of the navigation devices 1 sometimes have different data formats of the trip data depending on, for example, manufacturers.

Thus, to cope with the various kinds of the navigation devices 1, the user terminal 300 may include a data format converter of the trip data. For example, in supplying the trip data generated by the navigation device manufactured by a company A to the navigation device manufactured by a company B, the CPU 31 of the user terminal 300 may perform a data-format conversion process.

This makes it possible to provide the appropriate trip data to the various kinds of the navigation devices.

It is to be noted that the data format converter may be included in the server device 200 in the first embodiment.

In the forgoing description, an example is given in which the processor 11 of the navigation device 1 carries out the process of generating the trip data, but this is non-limiting. In a third embodiment, an example is given in which the user terminal 300 generates the trip data.

It is to be noted that the configurations described above and the processes of the steps described above are denoted by the same numerals, and description thereof is omitted as appropriate.

FIG. 16 illustrates a configuration example of the travel history management system S including the navigation device 1 and the user terminal 300. As illustrated in the figure, the vehicle 100A and the user terminal 300 such as a smartphone are configured to communicate with each other, while the vehicle 100B and the user terminal 300 are configured to communicate with each other.

The configuration of the vehicles 100A and 100B may be as illustrated in, for example, FIG. 1. The configuration of the navigation device 1 may be as illustrated in, for example, FIG. 2.

The communication between the vehicle 100 and the user terminal 300 may be established by the coupling between the communication unit included in the vehicle 100 and the communication unit 39 of the user terminal 300. Alternatively, the communication between the vehicle 100 and the user terminal 300 may be established by the coupling between the communication unit 13 of the navigation device 1 of the vehicle 100 and the communication unit 39 of the user terminal 300.

Figure 22:
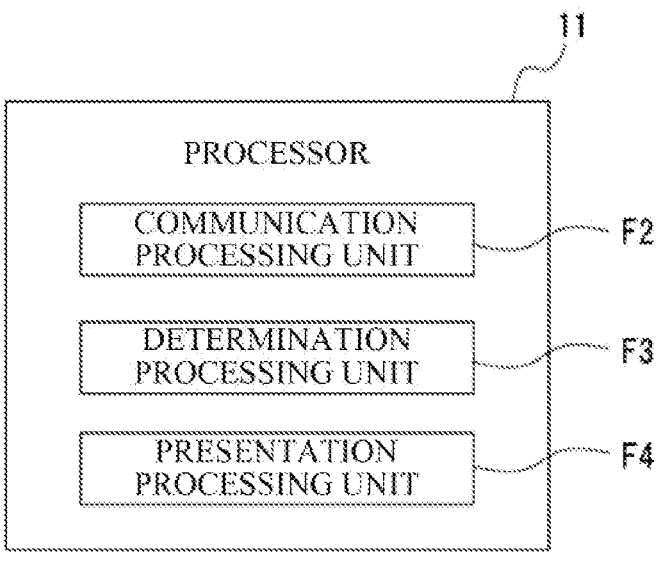
FIG. 22 is a block diagram of a control unit of a navigation device in an embodiment.

FIG. 22 illustrates an example of the configuration of the navigation device 1. The processor 11 of the navigation device 1 may serve as various subunits by executing a program.

In one example, the processor 11 may serve as the communication processing unit F2, the determination processing unit F3, and the presentation processing unit F4.

The communication processing unit F2 may transmit and receive various kinds of data by communicating with the user terminal 300 through the communication unit 13.

For example, the communication processing unit F2 may be triggered by, for example, the start of travel of the vehicle 100, to transmit the trip start data to the user terminal 300. The trip start data may include the date and hour data, but the trip start data does not have to include the date and hour data. The trip start data is data to be transmitted from the navigation device 1 to the user terminal 300 to notify the user terminal 300 to cause a start of the recording of the trip data. Thus, the trip start data is referred to as trigger data.

Moreover, the communication processing unit F2 may be triggered by, for example, the end of travel of the vehicle 100, to transmit the trip end data to the user terminal 300. The trip end data may include the date and hour data, but the trip end data does not have to include the date and hour data. The trip end data is data to be transmitted from the navigation device 1 to the user terminal 300 to notify the user terminal 300 to cause an end of the recording of the trip data. Thus, the trip end data is referred to as the trigger data.

Furthermore, the communication processing unit F2 may perform a process of receiving the trip data generated by the user terminal 300.

The determination processing unit F3 may perform a process of determining timing of the start of the recording of the trip data, and timing of a stop of the recording of the trip data. Based on a result of the determination, the communication processing unit F2 may transmit the trip start data and the trip end data to the user terminal 300.

The presentation processing unit F4 may perform a process of allowing the display unit 14 of the navigation device 1 to display the trip data. By this display process, for example, the presentation of the trip data as illustrated in FIG. 13 may be provided.

Figure 23:
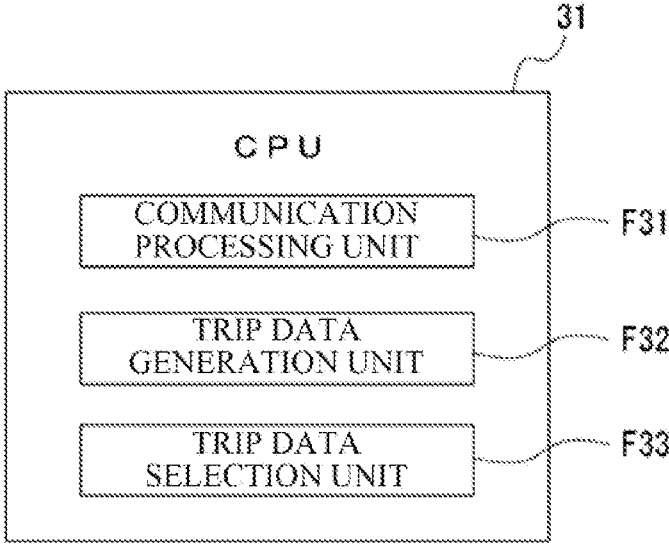
FIG. 23 is a block diagram of a CPU of a user terminal in the embodiment.

FIG. 23 illustrates an example of the configuration of the user terminal 300. The CPU 31 of the user terminal 300 may serve as various subunits by executing a program. For example, the CPU 31 of the user terminal 300 may execute a program, causing dedicated application software to be activated and serve as the various subunits on the user terminal 300. The dedicated application software performs, for example, management of the trip data.

For example, the CPU 31 of the user terminal 300 may serve as a communication processing unit F31, a trip data generation unit F32, and a trip data selection unit F33.

The communication processing unit F31 may receive the trip start data and the trip end data described above, from the navigation device 1.

The communication processing unit F31 may transmit the trip data generated based on the trip start data and the trip end data, to the navigation device 1.

The trip data to be handled by the navigation device 1 may sometimes vary depending on, for example, the manufacturers. In this case, the communication processing unit F31 may perform the data-format conversion process of the trip data, in transmitting the trip data to the navigation device 1.

It is to be noted that the data-format conversion process may be provided by a subunit separate from the communication processing unit F31 in the user terminal 300, or may be provided on the navigation device 1 side.

The trip data generation unit F32 may generate the trip data. As described, the trip data may be the data including, for example, the time data, e.g., the date and hour data, the positional data, the traveling distance data, the travel speed data, the vehicle data, and the image data.

The trip data generation unit F32 may generate the trip data based on detection data from various sensors included in the user terminal 300. At this occasion, the data to be generated may be data assumed to be a substitute for the data to be obtained by the vehicle 100.

For example, the travel speed data is originally the data to be obtained from, for example, the vehicle speed sensor included in the vehicle 100. The trip data generation unit F32 may calculate, as the travel speed data, a moving speed of the user terminal 300 based on data obtained by the user terminal 300. That is, the trip data generation unit F32 may calculate a change in the current position of the user terminal 300 based on a detection result by, for example, a GPS receiver included in the user terminal 300 instead of the data obtained from the vehicle speed sensor, and calculate the moving speed of the user terminal 300.

It should be appreciated that the user terminal 300 may be configured to acquire the sensing result by the vehicle speed sensor of the vehicle 100, or may be configured to receive the travel speed calculated on the vehicle 100 side.

In addition, the trip data generation unit F32 may use, as the time data, hour data acquired by the user terminal 300. It should be appreciated that the trip data generation unit F32 may use the hour data acquired from the navigation device 1 of the vehicle 100.

Similarly, the trip data generation unit F32 may calculate the traveling distance data based on the detection result by, for example, the GPS receiver included in the user terminal 300.

As for the vehicle data, the trip data generation unit F32 may use the data received from the vehicle 100. The vehicle data may be transmitted by the navigation device 1 to the user terminal 300 in accordance with the receipt of the trip start data, or may be transmitted by the navigation device 1 to the user terminal 300 when the navigation device 1 and the user terminal 300 are coupled to each other. However, as the vehicle data, data inputted to the user terminal 300 by the user may be used.

The trip data generation unit F32 may include image data in the trip data. An image to be included in the trip data may be an image captured by the in-vehicle camera and received from the navigation device 1, or may be an image captured by the user terminal 300.

When the image captured by the user terminal 300 is included in the trip data, for example, the trip data generation unit F32 may select an image captured after the time of the start of the trip and before the time of the end of the trip, and include the selected image in the trip data. Moreover, the trip data generating unit F32 may include an image captured within a predetermined period of time even after the time of the end of the trip. A reason for this is to include, in the trip data, an image captured while doing some sightseeing after arriving at the destination.

The trip data generation unit F32 may allow the user to select an image to be included in the trip data.

The trip data selection unit F33 may carry out a process of selecting the trip data to be transmitted to the navigation device 1 from within the trip data held in the storage 38.

In this selection process, the trip data selection unit F33 may select the trip data that satisfies a condition that, for example, the trip data is not held in the navigation device as a destination of the transmission.

The user terminal 300 such as a smartphone may be the data processor M to be used by multiple users, e.g., a terminal shared by family members. In such a case, based on login data to the dedicated application activated on the user terminal 300, the trip data selection unit F33 may select, for the parent user, the trip data generated when the parent user is on board the vehicle 100. The trip data selection unit F33 may select, for the child user, the trip data generated when the child user is on board the vehicle 100.

In selecting the appropriate trip data for each of the users, the trip data selection unit F33 may use an image of each user associated with the trip data.

For example, in transmitting the trip start data and the trip end data, the communication processing unit F2 of the vehicle 100 may transmit, to the user terminal 300, a facial image of the user captured by the in-vehicle camera to grasp a state of a driver while driving.

Upon receiving the facial image, the trip data generation unit F32 of the user terminal 300 may associate the generated trip data with an image file as the facial image and store the resultant trip data in, for example, the storage 38.

In selecting the trip data, the trip data selection unit F33 may compare the facial image of the user captured by an imaging unit of the user terminal 300 with the facial image associated with the trip data, and select the trip data when determining that the facial images are the same person.

Thus, it is possible to present the appropriate trip data to the user.

It is to be noted that the determination as to whether or not the facial images are the same person by comparing the facial images may be made by using an artificial intelligence (AI) model obtained by machine learning.

For each of the processes, similar processes to the steps described above are denoted by the same numerals, and description thereof is omitted as appropriate. In the following description, an example is given in which the trip data generated with respect to the vehicle 100A is held in the user terminal 300, and when the user is on board the vehicle 100B, the trip data generated with respect to the vehicle 100A is presented to the user on board the vehicle 100B while the trip data is generated based on the travel in the vehicle 100B.

Figure 24:
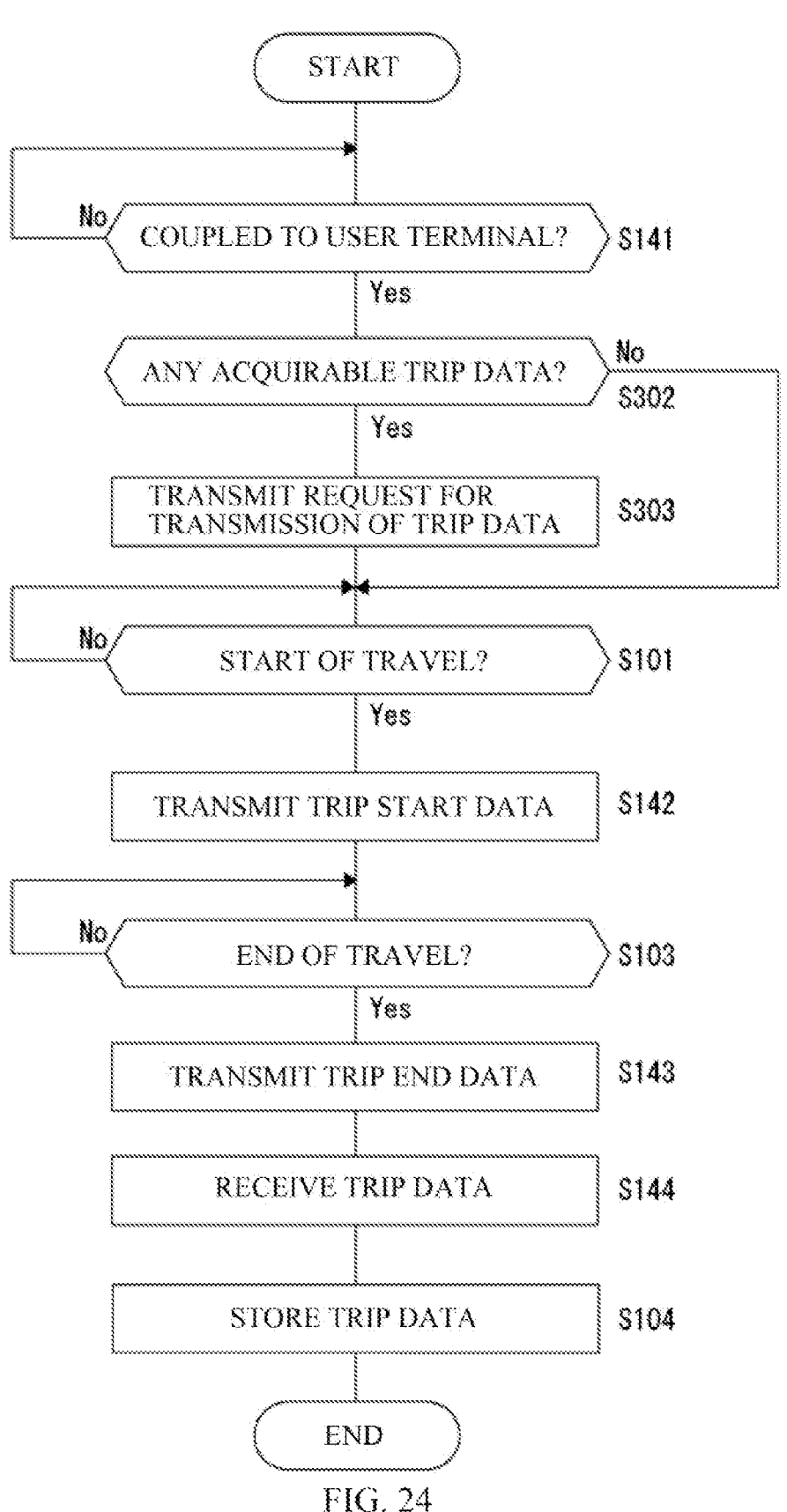
FIG. 24 is a flowchart illustrating an example of processing to be carried out by the navigation device in the embodiment.

Referring to FIG. 24, description is given of a flow of processing to be carried out by the processor 11 of the navigation device 1 of the vehicle 100B.

First, the processor 11 of the navigation device 1 may determine whether or not the processor 11 has been coupled to the user terminal 300 (step S141).

When the processor 11 has not been coupled to the user terminal 300 (step S141: NO), the processor 11 may carry out the process of step S141 again.

When determining that the processor 11 has been coupled to the user terminal 300 (step S141: YES), the processor 11 may determine the presence or absence of any acquirable trip data (step S302).

When determining that the acquirable trip data is present (step S302: YES), the processor 11 may request the user terminal 300 to transmit the trip data (step S303).

When determining that no acquirable trip data is present (step S302: NO), the processor 11 may avoid the process of step S303.

When determining the presence or absence of any acquirable trip data, the processor 11 may transmit a request to the user terminal 300 to allow the user terminal 300 to determine the presence or absence of any acquirable trip data. In this case, the processor 11 may perform the determination process of step S302 based on the determination result received from the user terminal 300.

The processor 11 may determine whether or not the vehicle 100B has started traveling (step S101). When determining that the vehicle 100B has started traveling (step S101: YES), the processor 11 may transmit the trip start data to the user terminal 300 (step S142).

When determining that the vehicle 100B has not started traveling (step S101: NO), the processor 11 may perform the process of step S101 again.

Thereafter, the processor 11 may determine whether or not the vehicle 100B has ended the travel (step S103). When determining that the vehicle 100B has ended the travel (step S103: YES), the processor 11 may transmit the trip end data to the user terminal 300 (step S143).

When determining that the vehicle 100B has not ended the travel (step S103: NO), the processor 11 may perform the process of step S103 again.

Thereafter, the processor 11 may receive the trip data generated by the user terminal 300 (step S144), and store the trip data in the storage 38 (step S104).

Figure 25:
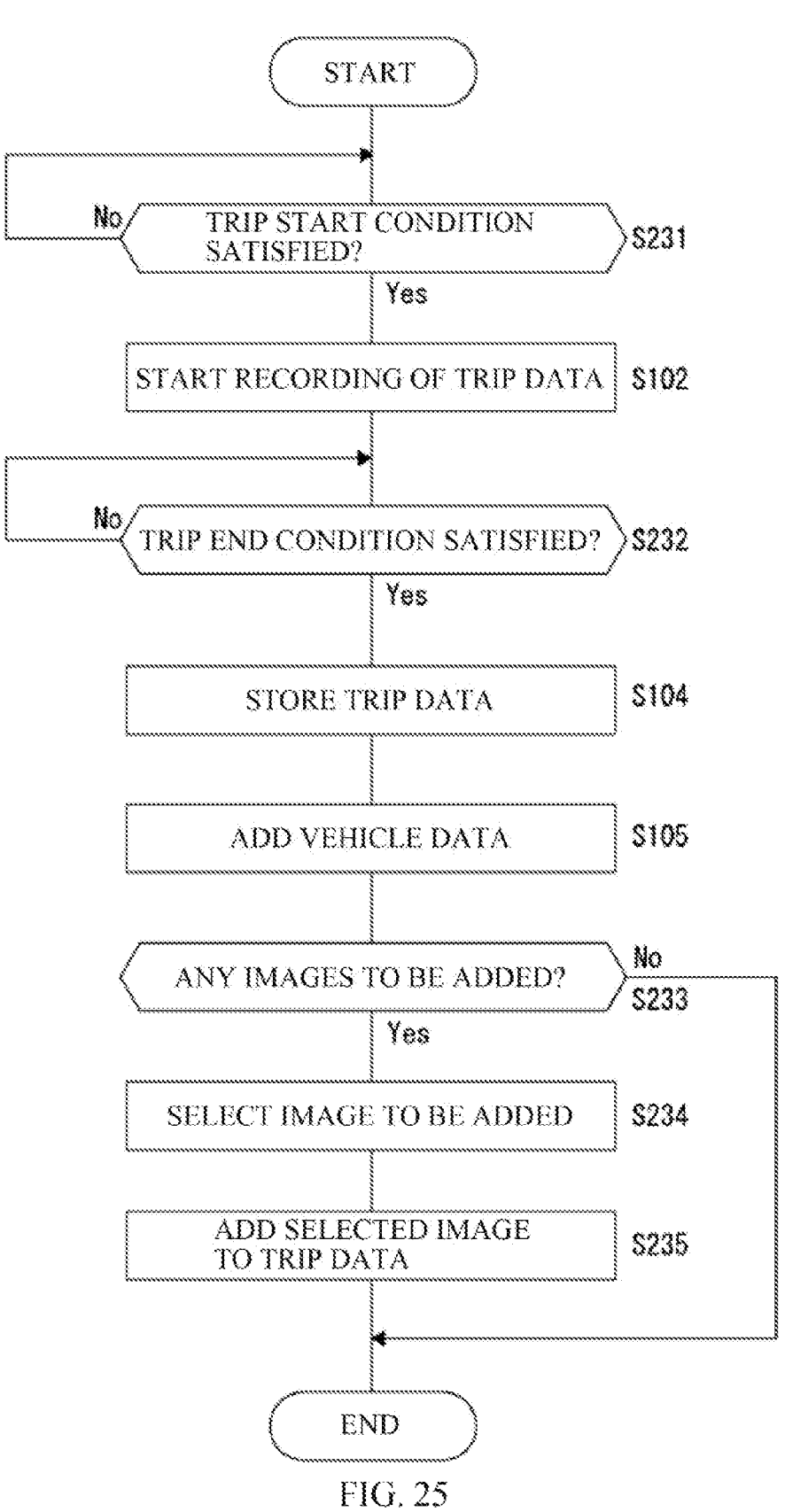
FIG. 25 is a flowchart illustrating an example of processing to be carried out by the user terminal in generation processing of the trip data in the embodiment.

FIG. 25 illustrates processing to be carried out when the user terminal 300 generates the trip data.

First, the CPU 31 of the user terminal 300 may determine whether or not a trip start condition has been satisfied (step S231).

Non-limiting examples of the case where the trip start condition has been satisfied may include a case where the trip start data has been received from the navigation device 1 to which the user terminal 300 is coupled, and a case where a trip start button, etc. has been pressed by an operation by the user.

When determining that the trip start condition has not been satisfied (step S231: NO), the CPU 31 of the user terminal 300 may perform the process of step S231 again.

When determining that the trip start condition has been satisfied (step S231: YES), the CPU 31 of the user terminal 300 may start the recording of the trip data (step S102).

Thereafter, the CPU 31 of the user terminal 300 may determine whether or not a trip end condition has been satisfied (step S232).

Non-limiting examples of the case where the trip end condition has been satisfied may include a case where the trip end data has been received from the navigation device 1 to which the user terminal 300 is coupled, and a case where a trip end button, etc. has been pressed by an operation by the user.

When determining that the trip end condition has not been satisfied (step S232: NO), the CPU 31 of the user terminal 300 may perform the process of step S232 again.

When determining that the trip end condition has been satisfied (step S232: YES), the CPU 31 of the user terminal 300 may end the recording of the trip data and store the trip data in, for example, the storage 38 (step S104).

The CPU 31 of the user terminal 300 may add the vehicle data to the trip data (step S105). The vehicle data to be added may be received from the vehicle 100B together with the trip start data or the trip end data, or may be received when the coupling between the user terminal 300 and the vehicle 100B is established.

The CPU 31 of the user terminal 300 may determine the presence or absence of an image to be added to the trip data (step S233).

As described above, the image to be added may be, for example, the image captured after the time of the start of the trip and before the time of the end of the trip, and the image captured within the predetermined period of time after the time of the end of the trip. Such images may include, for example, an image of a restaurant the user stopped by on the way to the destination, and an image captured at the destination.

When determining that the image to be added is present (step S233: YES), the CPU 31 of the user terminal 300 may select the image to be added (step S234) and add the image to the trip data (step S235).

When determining that no images to be added are present (step S233: NO), or after the process of step S235, the CPU 31 of the user terminal 300 may end the series of processes illustrated in FIG. 25.

Figure 26:
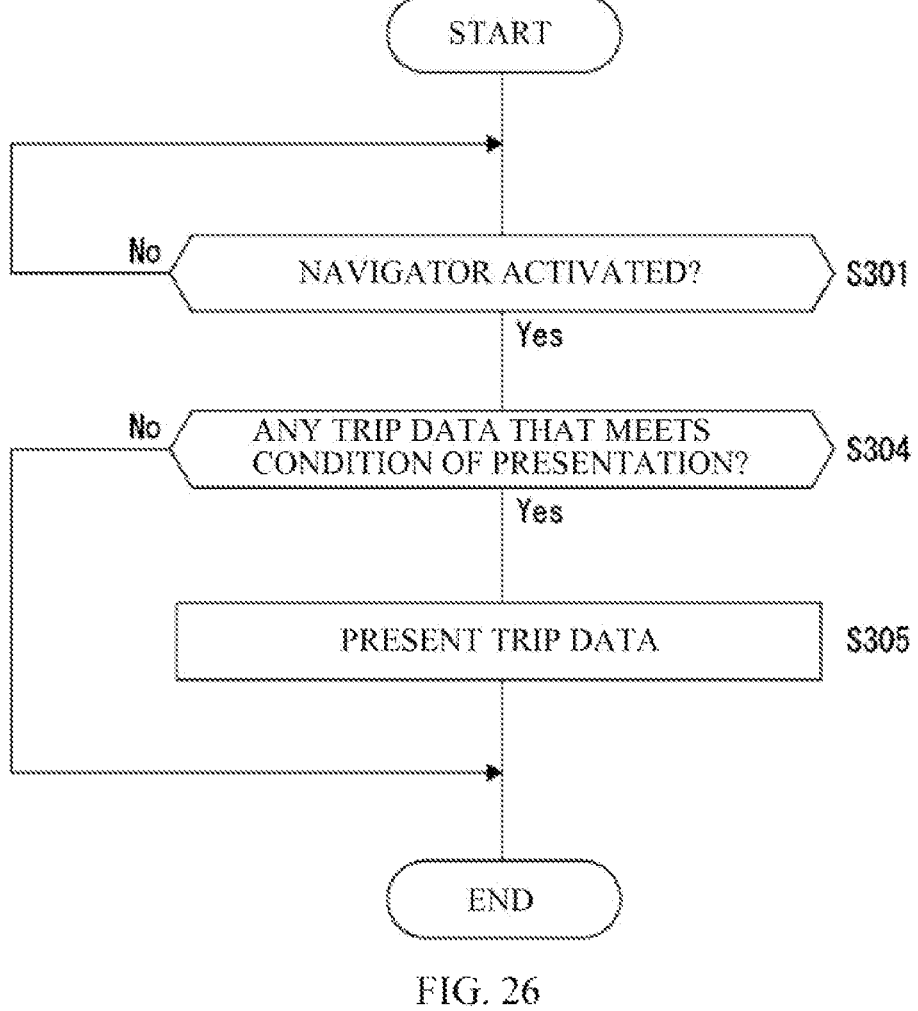
FIG. 26 is a flowchart illustrating an example of processing to be carried out by the navigation device in presentation processing of the trip data in the embodiment.

FIG. 26 illustrates an example of trip data presentation processing to be carried out by the processor 11 of the navigation device 1.

It is to be noted that the trip data presentation processing may be carried out, for example, after step S303 in FIG. 24 or in parallel with the processes of steps S101 to S104.

For example, the presentation of the trip data may be made, for example, before the determination in the affirmative (step S101: YES) as to the start of travel, when the user sets the destination or sets the travel route, after the acquirable trip data is acquired from the user terminal 300.

First, the processor 11 of the navigation device 1 may determine whether or not the navigator has been activated (step S301). When determining that the navigator has not been activated (step S301: NO), the processor 11 may repeat the process of step S301.

When determining that the navigator has been activated (step S301: YES), the processor 11 may determine the presence or absence of any trip data that meets the condition of presentation (step S304).

When determining that the trip data is present that meets the condition of presentation (step S304: YES), the processor 11 may present the trip data that meets the condition of presentation (step S305) and end the series of processes illustrated in FIG. 26.

When determining that no trip data is present that meets the condition of presentation (step S304: NO), the processor 11 may avoid the process of step S305 and end the series of processes illustrated in FIG. 26.

In this way, the presentation of the trip data to the user may be made, as illustrated in FIG. 13.

In this embodiment, the trip data generated based on the travel of the vehicle 100A on which the navigation device 1 is mounted is presented on the navigation device 1 mounted on the vehicle 100B.

Here, the navigation device 1 mounted on the vehicle 100A is referred to as a navigation device 1A while the navigation device 1 mounted on the vehicle 100B is referred to as a navigation device 1B.

There is possibility that the navigation device 1A and the navigation device 1B are navigation devices manufactured by different manufacturers. In this case, the data format of the trip data handled by the navigation device 1A may sometimes differ from the data format of the trip data handled by the navigation device 1B.

When the data formats of the trip data differ, it is sometimes difficult or troublesome to simply transfer the trip data from the navigation device 1A to the navigation device 1B.

In the configuration of this embodiment, the navigation device 1A and the navigation device 1B are assumed to transmit the trigger data as the trip start data and the trip end data to the user terminal 300 such as a smartphone, and receive the trip data generated in the user terminal 300.

Hence, it is possible for the user terminal 300 in this embodiment to generate the trip data in a unified data format based on the received trigger data.

Moreover, in transmitting the trip data to the navigation devices 1A and 1B, the CPU 31 of the user terminal 300 may carry out a process of converting the trip data into a data format suitable for each navigation device.

That is, the application software running on the user terminal 300 may be configured to convert the data format to cope with the various navigation devices such as the navigation device 1A and the navigation device 1B.

Hence, it is possible to transmit the appropriate trip data to the navigation devices 1 of different kinds, leading to the appropriate presentation of the trip data to the user.

The travel history management system S described in the third embodiment includes one or more navigation devices 1 and a mobile terminal device, e.g., the user terminal 300 such as a smartphone. The one or more navigation devices 1 each include one or more first processors, e.g., the processor 11, and a first storage medium, e.g., the storage 12. The first storage medium contains a first program to be executed by the one or more first processors. The first program includes one or more first commands. The one or more first commands cause the one or more first processors to carry out each of processes.

The processes include, for example, a process of transmitting trip start data and trip end data to the mobile terminal device, e.g., the user terminal 300. The trip start data causes a start of recording of trip data. The trip end data causes an end of the recording of the trip data.

Moreover, the mobile terminal device, e.g., the user terminal 300 such as a smartphone, includes one or more second processors, e.g., the CPU 31 of the user terminal 300, and a second storage medium, e.g., the storage 38 of the user terminal 300. The second storage medium contains a second program to be executed by the one or more second processors. The second program includes one or more second commands. The one or more second commands cause the one or more second processors to carry out each of processes.

The processes include: for example, a process of receiving the trip start data and the trip end data from any one of the one or more navigation devices 1; and a process of generating the trip data based on the trip start data and the trip end data.

That is, because the trip data is generated by the user terminal 300, it is possible to unify the data format of the generated trip data.

Hence, in the user terminal 300, it is possible to enhance efficiency of the management of the trip data.

Moreover, the generated trip data is managed by the user terminal 300, making it easier to transfer the trip data to the other navigation devices 1.

Moreover, the one or more navigation devices may include: a first navigation device, e.g., the navigation device 1B; and a second navigation device separate from the first navigation device, e.g., the navigation device 1A. The one or more second commands may cause the one or more second processors, e.g., the CPU 31 of the user terminal 300, to carry out, upon receipt of a request for transmission of the trip data from the first navigation device, e.g., the navigation device 1B, a process of transmitting the trip data to the first navigation device. The trip data is generated based on the trip start data and the trip end data received from the second navigation device, e.g., the navigation device 1A.

Hence, it is possible to present the user with the data regarding the resorts or the restaurants visited, together with the vehicle data regarding the vehicle the user was on board when the trip data was generated. This makes it possible to remind the user of, for example, the journey together with the memories with the vehicle. That is, it is possible to present useful information to the user.

The one or more second commands may cause the one or more second processors, e.g., the CPU 31 of the user terminal 300, to carry out a process of selecting an image to be included in the trip data, based on time data regarding the trip start data and time data regarding the trip end data.

The trip start data may include, for example, the time data. In this case, the trip data may be generated based on the time acquired on the navigation device 1 side. Alternatively, the trip start data may be assumed to serve as simply the trigger data, and the trip data may be generated with the use of the time data on the user terminal 300 side on the occasion of the receipt of the trigger data.

Thus, it is possible to generate the trip data including the time data. This makes it possible to appropriately select the image to be included in the trip data based on the time data included in the trip data. In addition, by using the time data in the presentation to the user, it is possible to present the trip data including the image, making it easier to bring back the user's memories.

Moreover, the one or more second commands may cause the one or more second processors, e.g., the CPU 31 of the user terminal 300, to carry out: a process of accepting a trip start operation instead of receiving the trip start data (process of step S231); a process of accepting a trip end operation instead of receiving the trip end data (process of step S232); and a process of generating the trip data based on the trip start operation and the trip end operation.

This makes it possible to generate the trip data with the use of the configuration of the user terminal 300 even when, for example, the vehicle 100 is devoid of the navigation device 1.

Hence, it is possible to present the appropriate trip data to the user.

The navigation device 1 described in the third embodiment includes one or more processors, e.g., the processor 11, and a storage medium, e.g., the storage 12. The storage 12 contains a program to be executed by the one or more processors. The program includes one or more commands. The one or more commands cause the one or more processors to carry out each of processes.

The processes include: for example, a process of transmitting trip start data and trip end data to a random device, in which the trip start data causes a start of recording of trip data, and the trip end data causes an end of the recording; and a process of receiving the trip data generated by the random device, e.g., the user terminal 300, based on the trip start data and the trip end data.

By generating the trip data on the user terminal 300 side, it is possible to generate the trip data even when the user travels by the vehicle 100 devoid of the navigation device 1.

Hence, it is possible to present appropriate information to the user.

In the third embodiment, an example is described in which the user terminal 300 such as a smartphone generates the trip data, but this is non-limiting. For example, the server device 200 that has received the trip start data and the trip end data from the navigation device 1 may generate the trip data.

In the forgoing examples, an example is described in which the trip data is presented when the user sets the destination, etc. on the navigation device 1. However, the timing of the presentation of the trip data is not limited thereto.

For example, the trip data may be presented when the current position of the vehicle 100 on travel and the positional data included in the trip data approach within a predetermined distance.

The forgoing embodiments and modification examples may be combined as appropriate.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The processor 11 of the navigation device 1 and the CPU 31 of the user terminal 300 illustrated in FIGS. 2 and 5 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 11 of the navigation device land the CPU 31 of the user terminal 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 11 of the navigation device 1 and the CPU 31 of the user terminal 300 illustrated in FIGS. 2 and 5.

The invention claimed is:

1. A navigation device to be mounted on a vehicle, comprising:
   a communicator configured to be coupled to a server device via a communication network, and communicatively transmit and receive data from the server device;
   a display configured to display data;
   one or more processors; and
   a storage medium configured to store a program to be executed by the one or more processors, wherein
   the one or more processors is configured to:
      transmit, via the communicator and to the server device, a request for trip data generated in a random navigation device mounted on a random vehicle, the random vehicle being different than the vehicle on which the navigation device is to be mounted,
      receive, via the communicator and from the server device, the trip data, the trip data comprising:
      positional data of the random vehicle;
      vehicle data regarding the random vehicle; and
      user identification data identifying a user of the random vehicle, determine whether the received trip data meets a predetermined condition of presentation, the predetermined condition of presentation being:
      a distance from a position identified by the positional data of the received trip data to a current position of the vehicle being smaller than a predetermined distance; and
      the user of the random vehicle identified by the user identification data of the trip data being the same as the user of the vehicle, and
   in response to the received trip data meeting the predetermined condition of presentation, display, via the display, the received trip data to a user of the vehicle based on a route of the vehicle, the vehicle being controlled to travel along the route to a set destination.

2. The navigation device according to claim 1, wherein the trip data further comprises time data regarding time of generation of the trip data in the random navigation device.

3. The navigation device according to claim 1, wherein the one or more processors are configured to
   set a travel route from a current position of the vehicle to a designated destination, and
   display the received trip data, when a distance from the travel route to a position identified by the positional data is smaller than a predetermined distance.

4. The navigation device according to claim 2, wherein the one or more processors are configured to
   set a travel route from a current position of the vehicle to a designated destination, and
   display the received trip data, when a distance from the travel route to a position identified by the positional data is smaller than a predetermined distance.

5. The navigation device according to claim 1, wherein the vehicle data comprises at least one of the following regarding the random vehicle: a vehicle identification, a name of a vehicle model, a model year, color, an option code, an image of the random vehicle, running time, data regarding a digital key, or one or more images captured while the random vehicle is traveling.

6. The navigation device according to claim 5, wherein the one or more images comprise a still image, or a moving image, or both.

* * * * *